(12) United States Patent
Jin et al.

(10) Patent No.: US 8,245,318 B2
(45) Date of Patent: Aug. 14, 2012

(54) SIDEWALL TRACING NANOPROBES, METHOD FOR MAKING THE SAME, AND METHOD FOR USE

(75) Inventors: Sungho Jin, San Diego, CA (US); Li-Han Chen, San Diego, CA (US); Gregory Dahlen, Santa Barbara, CA (US); Hao-Chih Liu, Goleta, CA (US)

(73) Assignee: The Regents of the University of California, Oakland, CA (US)

( * ) Notice: Subject to any disclaimer, the term of this patent is extended or adjusted under 35 U.S.C. 154(b) by 302 days.

(21) Appl. No.: 12/375,161

(22) PCT Filed: Jul. 27, 2007

(86) PCT No.: PCT/US2007/016859
§ 371 (c)(1),
(2), (4) Date: Jan. 26, 2009

(87) PCT Pub. No.: WO2008/013919
PCT Pub. Date: Jan. 31, 2008

(65) Prior Publication Data
US 2010/0005553 A1    Jan. 7, 2010

Related U.S. Application Data

(60) Provisional application No. 60/833,634, filed on Jul. 27, 2006.

(51) Int. Cl.
*G01Q 70/12* (2010.01)

(52) U.S. Cl. ............... 850/58; 850/60; 850/56; 850/57; 977/902; 977/943; 977/947; 977/949

(58) Field of Classification Search ............... 73/104, 73/105; 850/21, 29, 32, 40, 45, 52, 55, 56, 850/57, 58, 60; 977/902, 943, 947, 949
See application file for complete search history.

(56) References Cited

U.S. PATENT DOCUMENTS

| | | | |
|---|---|---|---|
| 5,242,541 A | | 9/1993 | Bayer et al. |
| 5,382,795 A | | 1/1995 | Bayer et al. |
| 6,401,526 B1 | | 6/2002 | Dai et al. |
| 6,716,409 B2 | | 4/2004 | Hafner et al. |
| 2002/0112814 A1* | | 8/2002 | Hafner et al. .............. 156/272.2 |
| 2004/0255652 A1* | | 12/2004 | Lee et al. ......................... 73/105 |
| 2005/0163931 A1* | | 7/2005 | Xu et al. ....................... 427/258 |
| 2007/0186627 A1* | | 8/2007 | Yi et al. ........................... 73/105 |

(Continued)

OTHER PUBLICATIONS

Noy, Aleksandr et al; Chemical Force Microscopy; Annu. Rev. Mater, Sci.; 1997; 27:381-421.

(Continued)

*Primary Examiner* — David A Vanore
*Assistant Examiner* — Nicole Ippolito
(74) *Attorney, Agent, or Firm* — Sanford Astor; Brooks Kushman P.C.

(57) ABSTRACT

Sidewall tracing nanoprobes, in which the tip shape of the nanoprobe Is altered so that the diameter or width of the very tip of the probe is wider than the diameter of the supporting stem. Such side protruding probe tips are fabricated by a subtractive method of reducing the stem diameter, an additive method of increasing the tip diameter, or sideway bending of the probe tip. These sidewall tracing nanoprobes are useful for inspection of semiconductor devices, especially to quantitatively evaluate the defects on the side wall of trenches or via holes.

22 Claims, 17 Drawing Sheets

U.S. PATENT DOCUMENTS

2007/0221840 A1* 9/2007 Cohen et al. .................. 250/306

OTHER PUBLICATIONS

Hansma, Helen G. et al; Biomolecular imaging with the atomic force microscope; Annu. Rev. Biophys. Biomol. Struct.; 1994; 23:115-39.

Vettiger, P. et al; Ultrahigh Density, High-Data Rate NEMS-Based AFM Data Storage System; J. Microelectron. Eng. 46, 11-17 (1999).

Dai, Hongjie et al; Nanotubes as nanoprobes in scanning probe microscopy; Nature; 384, 147-150 (1996).

Wong, Stanislaus S. et al; Carbon Nanotube Tips: High-Resolution Probes for Imaging Biological Systems; J. Am. Chem. Soc.; 120, 603-604 (1998).

Nishijima, Hidehiro et al; Carbon-nanotube tips for scanning probe microscopy: Preparation by a controlled process and observation of deoxyribonucleic acid; Appl. Phys. Lett.; 74, 4061-4063 (1999).

Stevens, Ramsey M.D. et al; Carbon nanotubes as probes for atomic force microscopy; Nanotechnology; 11, 1-5; (2000).

Yenilmez, Erhan et al; Wafer scale production of carbon nanotube scanning probe tips for atomic force microscopy; Appl. Phys. Lett.; 80, 2225-2227 (2002).

Martin, Yves et al; Method for imaging sidewalls by atomic force microscopy; Appl. Phys. Lett. 64 (19), (1994).

Martin, Yves et al; Toward accurate metrology with scanning force microscopes; J. Vac. Sci. Technol. B 13 (6); (1995).

Liu, H et al; Advanced AFM Probes: Wear resistant designs; J. Vac. Sci. Technol. B 23(6), 3090-3093; (2005).

Liu, H et al; Carbon Nanotube AFM Probes for Microlithography Process Control; Proc. of SPIE vol. 6152, 61522Y; (2006).

Reiss, G. et al; Scanning tunneling microscopy on rough surfaces: Tip-shape-limited resolution; J. Appl. Phys. 67, 1156; (1990).

Griffith, J.E. et al; Scanning probe metrology; J. Vac. Sci. Technol. A10, 674; (1992).

Merkulov, Vladimir I. et al; Controlled alignment of carbon nanofibers in a large-scale synthesis process; Appl. Phys. Lett. 80, 4816; (2002).

Aubuchon, Joseph F. et al; Multiple Sharp Bendings of Carbon Nanotubes during Growth to Produce Zigzag Morphology; Nano Letters 4, 1781; (2004).

Morales, Alfredo M. et al; A Laser Ablation Method for the Synthesis of Crystalline Semiconductor Nanowires; Science 279, 208; (1998).

Huang, Michael H. et al; Room-Temperature Ultraviolet Nanowire Nanolasers; Science 292, 1897; (2001).

Yang, Peidong et al; Controlled Growth of ZnO Nanowires and Their Optical Properties; Advanced Functional Materials 12, 323; (2002).

Stevens, R. et al; Improved fabrication approach for carbon nanotube probe devices; Appl. Phys. Lett. 77, 3453; (2000).

Hall, A. et al; Simple and efficient for carbon nanotube attachment to scanning probes and other substrates; Appl. Phys. Lett. 82, 2506; (2003).

Tang, Jie et al; Rapid and Reproducible Fabrication of Carbon Nanotube AFM Probes by Dielectrophoresis; Nano Lett. 5, 11; (2005).

Chen, I-Chen et al; Extremely sharp carbon nanocone probes for atomic force microscopy imaging; Appl. Phys. Lett. 88, 153102; (2006).

Chen, L-H et al; Control of carbon nanotube morphology by change of applied bias field during growth; Appl. Phys. Lett. 85, 5373; (2004).

* cited by examiner

EXAMPLE SUBTRACTIVE PROCESS FOR SIDEWALL TRACING NANOPROBE

---- OXYGEN PLASMA ETCHING (0 VS 1.5 MIN AT 200 WATT POWER)

(a)  (b)

AS-GROWN CNT USING NI CATALYST

SIDEWALL THINNED BY OXYGEN PLASMA ETCH

CARBON NANOTUBES GROWN WITH Pd CATALYST NANOPARTICLE TIP

SIDEWALL TRACING NANOPROBES, METHOD FOR MAKING THE SAME, AND METHOD FOR USE

CROSS REFERENCE TO RELATED APPLICATIONS

This Application is a National Stage of International Application No. PCT/US07/16859, filed on Jul. 27, 2007, which claims priority to and benefit of U.S. Provisional Application Ser. No. 60/833634, filed on Jul. 27, 2006.

FIELD OF INVENTION

The present invention relates to nanoprobes, in particular, atomic force microscopy probes with sidewall tracing capability.

BACKGROUND OF THE INVENTION

It is well known that the resolution of probe microscopy or probe writing, such as atomic force microscopy (AFM) imaging and probe-based information storage systems are determined by the sharpness, size and shape of the probe tip. For general background, see the following articles; Rugar, et al, "Atomic force microscopy", Phys. Today 43(10), 23-30 (1990), Noy, et al, "Chemical force microscopy", Annu. Rev. Mater. Sci. 27, 381-421 (1997), Hansma, et al, "Biomolecular imaging with the atomic force microscope", Annu. Rev. Biophys. Biomol. Struct. 23, 115-139 (1994), Shao, et al, "Progress in high resolution atomic force microscopy in biology", Quart. Rev. Biophys. 28, 195-251 (1995), G. K. Binnig, et al, U.S. Pat. No. 5,835,477, Nov. 10, 1998, "Mass-Storage Applications of Local Probe Arrays," and an article by P. Vettiger, et al, "Ultrahigh Density, High-Data-Rate NEMS-Based AFM Data Storage System," J. Microelectron. Eng. 46, 11-17 (1999).

Typical commercially available AFM probe tips are made of silicon or silicon nitride ($Si_3N_4$) which is microfabricated into a pyramid configuration. Such probes have a typical tip radius of curvature in the ~50 nm regime, thus exhibiting a limited lateral resolution, and their rigid pyramid shape does not allow easy access to narrow or deep structural features.

Utilizing the advances in carbon nanotube science and technology, a potential new breakthrough in probe technology, i.e., employing a "thin-probe-on-pyramid" configuration was presented, for example, see U.S. Pat. No. 6,716,409, "Fabrication of nanotube microscopy tips" issued to Hafner, et al. on Apr. 6, 2004, U.S. Pat. No. 6,401,526, "Carbon nanotubes and methods of fabrication thereof using a liquid phase catalyst precursor" issued to Dai, et al. on Jun. 11, 2002, articles by Dai, et al., "Nanotubes as nanoprobes in scanning probe microscopy", Nature 384, 147-150 (1996), by Colbert, et al, "Growth and sintering of fullerene nanotubes", Science 266, 1218-1222 (1994), by Wong, et al, "Carbon nanotube tips: High-Resolution probes for imaging biological systems", J. Am. Chem. Soc. 120, 603-604 (1998), by Nishijima, et al, "Carbon nanotube tips for scanning probe microscopy: preparation by a controlled process and observation of deoxyribonucleic acid", Appl. Phys. Lett. 74, 4061-4063 (1999), Stevens, et al, "Carbon nanotubes as probes for atomic force microscopy", Nanotechnology 11, 1-5 (2000), by Yenilmez, et al, "Wafer scale production of carbon nanotube scanning probe tips for atomic force microscopy", Appl. Phys. Lett. 80, 2225-2227 (2002), and by Minh, et al, "Selective growth of carbon nanotubes on Si microfabricated tips and application for electron field emitters", J. Vac. Sci. Technol. B21(4), 1705-1709 (2003). Carbon nanotubes are typically grown by using chemical vapor deposition (CVD) technique in which hydrocarbon gas is decomposed at high temperature often assisted by DC or RF plasma.

The long and slender geometry of carbon nanotubes (high aspect ratio) offers obvious advantages for probing narrow and deep features. The elastically compliant behavior of high aspect ratio nanotubes is also advantageous. Even when the stress encountered by the nanotube probe reaches beyond a critical force, the nanotube can elastically buckle and recover to accommodate the strain, thus limiting the maximum force exerted onto a sample being imaged by the AFM probe. This is particularly advantageous when the samples being examined are mechanically soft or fragile such as in the case of biological surfaces.

In these prior art processes the attachment of a carbon nanotube onto an AFM probe tip is accomplished by several different means, for example, using acrylic adhesives under optical microscope, carbon deposition in a scanning electron microscope (SEM), or electric arc discharge technique. In-situ growth of carbon nanotubes directly on AFM tips were also reported in US patents by Hafner, et al. and Dai et al., and articles by Yenilmez, et al. and by Minh, et al. cited above.

With the trend of miniaturization and nanoscale devices for semiconductors and electronic devices, an inspection of the fabricated devices and a critical control of the three-dimensional dimensions and features is essential. Atomic Force Microscopy (AFM) or Scanning Probe (or Force) Microscopy (SPM, SFM) is a versatile technology for measurement and inspection of the surface of semiconductors during fabrication as the vertical and lateral resolution can be nanometer- or subnanometer-scale. Conventional AFM applications for topological measurements are on largely horizontal or non-reentrant surfaces, and are limited by the pyramid (or parabolic) shape of the probe tip and the AFM's scanning control algorithm.

A special type of AFM called Critical Dimensional AFM (CD-AFM) is designed to allow scanning of sidewall and enable measurements of vertical and reentrant surfaces of the sample, for example, in trenches or via holes of semiconductor substrates and devices. Two key technologies for CD-AFM are:

1. Advanced scanning algorithms (CD modes)
2. Special probe shapes (CD probes).

A CD probe usually has a flared apex region. The lateral edges of the tip enable accurate profiling of vertical or reentrant surfaces. Current CD-probes are primarily made of silicon material and the tip width is in the range of 30 to 1000 nm. See U.S. Pat. No. 5,171,992, Joachim G. Clabes et al., "Nanometer scale probe for an atomic force microscope, and method for making same", Dec. 15, 1992, U.S. Pat. No. 5,242,541, Thomas Bayer et al., "Method of producing ultrafine silicon tips for the AFM/STM profilometry", Sep. 7, 1993, U.S. Pat. No. 5,382,795, Thomas Bayer et al., "Ultrafine silicon tips for AFM/STM profilometry", Jan. 17, 1995, Yves Martin and H. Kumar Wickramasinghe, "Method for imaging sidewalls by atomic force microscopy", Appl. Phys. Lett. 64 (19), 9 May 1994, Yves Martin and H. Kumar Wickramasinghe, "Toward accurate metrology with scanning force microscopes", J. Vac. Sci. Technol. B 13 (6), November/December 1995 H. Liu, M. Klonowski, D. Kneeburg, G. Dahlen, M. Osborn, T. Bao, "Advanced AFM Probes: Wear Resistant Designs", J. Vac. Sci. Technol. B 23 (6), pp 3090-3093, 2005.

Silicon-based CD-AFM probes have not shown the capability to support 45 nm node AFM metrology (which means a capability to be inserted into 45 nm trenches or via holes and carry out sidewall scanning). Since such CD-AFM probes which can reliably perform smaller-node metrology below 45 nm has not been demonstrated, there is a need to develop new, non-silicon probes capable of such a task.

As the dimensions of the sample shrink (for example, semiconductor CMOS devices and magnetic heads for hard drive disks), the fabrication of silicon-based CD probes becomes increasingly challenging. Moreover, the wear rate of the tips accelerates as the size shrinks. For instance, in some semiconductor applications the entire flare of a silicon tip may be worn away while scanning a single measurement site. In contrast, carbon nanotube (CNT) tips have been shown to have lifetimes easily exceeding silicon tips by an order of magnitude. See an article by Liu et al., *Proc. of SPIE Vol.* 6152, 61522Y (2006). A second, key advantage of a CNT tip is that the higher strength (Young's modulus) of the CNT vs. silicon allows tip lateral stiffness to be maintained. CD tip lateral stiffness is a growing problem for silicon tips as the tip size shrinks and directly results in measurement error and the tip actually "sticking" to the scanned feature. Consequently, CD probe tips made of non-silicon material is preferred.

This invention discloses new and novel, sidewall tracing AFM probes with such desirable characteristics and is also capable of scanning nanoscale features in the small trenches or via holes. Various embodiments, various probe configurations, alternative fabrication methods, various applications, and the various modes of uses are described.

Scanning probe microscopy (SPM) such as atomic force microscopy (AFM) has been an important and powerful technique for resolving nanoscale features, and thus has been utilized for various scientific, engineering, and biological applications. The key component of SPM is the probe tip, as the resolution of SPM imaging is determined by its sharpness, size and shape. See articles by G. Reiss, et al, "Scanning tunneling microscopy on rough surfaces: tip-shape-limited resolution", J. Appl. Phys. 67, 1156 (1990), and by J. E. Griffith et al, "Scanning probe metrology", J. Vac. Sci. Technol. A10, 674 (1992). Typical commercially available SPM probe tips are made of silicon or silicon nitride microfabricated into a pyramid configuration. Such probes are often easily broken or worn out during long time operation. They also generally exhibit a limited lateral resolution, and their rigid pyramid shape does not allow easy access to narrow or deep structural features.

Carbon nanotubes (CNTs) have attracted much attention due to their various interesting physical and chemical properties. The high aspect ratio geometry and the nano-scale diameter of the CNT offer obvious advantages for imaging as an AFM probe. Moreover, due to its good mechanical flexibility, such a CNT probe is also suitable for studying soft matters such as biological samples with minimal damage.

Carbon nanotubes (CNTs), either single wall carbon nanotubes (SWNTs) or multiwall nanotubes (MWNTs) can be grown in a controlled manner using chemical vapor deposition (CVD) processing. Carbon nanotubes with graphene walls parallel to the axis of the nanotube as well as those with graphene walls at an angle to the axis of the nanotube can be grown. The latter type of carbon nanotubes, sometimes called nanofibers, often still have a nanoscale tube configuration, and hence will be referred throughout this application as nanotubes. Vertically aligned, periodically spaced MWNTs can be grown in a controlled manner using DC-plasma enhanced CVD process using an applied electric field. See V. I. Merkulov, et al, Appl. Phys. Lett. 80, 4816 (2002), J. F. AuBuchon, et al, Nano Letters 4, 1781 (2004).

In addition to carbon nanotubes, there are other types of nanowires which may also be useful as the nanoprobes. Some examples include silicon nanowires with gold-rich catalyst particle at the tip, see an article by Morales et al, Science 279, 208 (1998), and ZnO nanowires with gold-rich Au—Zn catalyst particle at the tip, see articles by Huang, et al, Science 292, 1897 (2001) and by Yang et al, Advanced Functional Materials 12, 323 (2002).

There have been several approaches developed for fabrication of CNT based probes. Most approaches are based on attaching CNTs (mostly multiwall nanotubes) on commercial pyramid tips by acrytic adhesive, electric field, arc welding, magnetic field and liquid phase dielectrophoresis. See articles by H. Dai, et al, Nature 384, 147 (1996), H. Nishijima, et al, Appl. Phys. Lett. 74, 4061 (1999), by R. Stevens, et al, Appl. Phys. Lett. 77, 3453 (2000), by A. Hall, et al, Appl. Phys. Lett. 82, 2506 (2003), and by J. Tang, et al, Nano Lett. 5, 11 (2005). These methods are operated manually and are time consuming. The attachment angle, the number of CNTs attached, and adhesion strength are not always controllable. A direct growth of CNTs with catalyst particles or catalyst film coating on Si tips by thermal CVD has also been reported. See an article by I. C. Chen et al., "Extremely sharp carbon nanocone probes for atomic force microscopy imaging", Appl. Phys. Lett. 88, 153102 (2006).

In order to allow metrology and inspection of sidewalls in the trenches and via holes of semiconductor devices, the tip of the AFM nanoprobe has to be either bent or be thicker than the rest of the probe length. Most of these nanotubes or nanowires are equi-diameter or tapered down sharp along the length of the wire toward the tip, and hence they do not allow sidewall tracing capability if used as the AFM probe. The possibility of utilizing sharply bent carbon nanotubes for sidewall metrology has been disclosed in prior art patent applications as discussed earlier. The use of bent nanotubes generally require more complicated CVD deposition processing.

Therefore it is desirable to find a unique, alternative and simpler fabrication processing for sidewall tracing nanoprobes, for example, by altering the tip shape of already fabricated nanowires or nanotubes in such a way that the diameter or width of the very tip of the probe is wider, greater than the diameter of the supporting wire beyond the catalyst particle at the tip. This invention discloses such processing techniques to allow fabrication of unique simple, reliable and protection-layer-free techniques for fabricating a single SPM probe on the cantilever and unique probe tip structures by utilizing the unique sidewall tracing nanoprobes.

SUMMARY OF THE INVENTION

Sidewall tracing nanoprobes are useful for characterization of surface topography of vertically positioned walls of various electronic, magnetic and optical devices, especially those with high-density, nanoscale structures. This invention discloses unique sidewall tracing probe structures and their fabrication processes, which alters the tip shape of the nanoprobe so that the diameter or width of the very tip of the probe is wider than the diameter of the supporting stem to allow sidewall probing. In one embodiment, such side protruding probe tips are fabricated by a subtractive method of reducing the stem diameter. In another embodiment, the sidewall tracing nanoprobes are fabricated by an additive method of increasing the tip diameter by selective deposition of additional materials on the probe tip. In yet another embodiment, sideway bending of the probe tip is introduced to enable the sidewall tracing AFM operations. These sidewall tracing nanoprobes are useful for inspection of semiconductor devices, especially to quantitatively evaluate the defects on the side wall of trenches or via holes.

BRIEF DESCRIPTION OF THE DRAWINGS

The nature, advantages and various additional features of the invention will appear more fully upon consideration of the illustrative embodiments now to be described in detail with the accompanying drawings. In the drawings.

It is to be understood that the drawings are for purposes of illustrating the concepts of the invention and are not to scale.

DETAILED DESCRIPTION OF THE INVENTION

Figure 1:
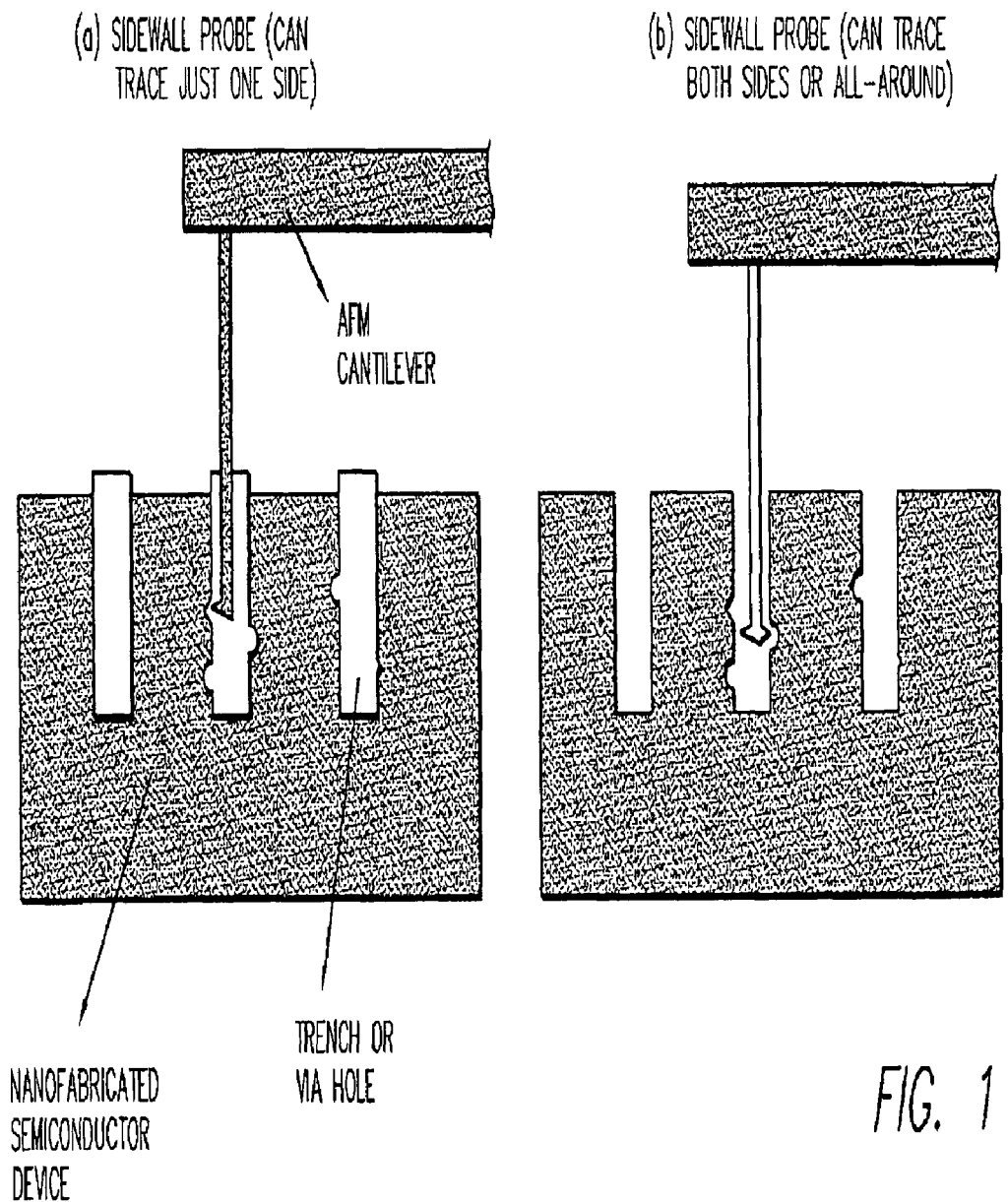
FIG. 1 represents a schematic illustration of exemplary sidewall tracing AFM probes for semiconductor trenches or via holes according to the invention. (a) A probe that can trace just one side, (b) A probe that can trace both sides of a trench or all-around the via hole sidewall.

Shown in FIG. 1 are schematic illustrations of the basic concepts of the invention for sidewall tracing nanoprobes. In FIG. 1(a), an exemplary configuration of the sidewall tracing nanoprobe is illustrated. The nanoprobe has a protruding part on the side of the tip which allows metrology tracing of the sidewall topography and quantitative detection of the degree of ins and outs on the sidewall. A more desirable embodiment is a nanoprobe having a side protrusion near the tip on both the left and right side of the tip, and even more desirably having the protrusion all the way around the circular periphery of the tip is described in FIG. 1(b). Although the one-side protruding probe tip of FIG. 1(a) can in principle be rotated to face the opposite wall or other orientations within a via hole to perform sidewall metrology, an in-place rotation of the AFM probe tip, which is typically mounted on a cantilever, is not simple. In order to carry out metrology on the opposite wall, the probe has to be retracted, the cantilever re-positioned, and the probe is then re-inserted to the same trench or via hole. Therefore, it is advantageous if the sideway protrusion at the probe tip is made along at least two directions, preferably all the way around, to allow convenient, multi-direction sidewall metrology.

While these configurations can be prepared by a delicate and laborious silicon microfabrication processes involving Si, Si oxide or Si nitride type traditional materials, these materials tend to be brittle and easily fractured, and such a probe microfabrication using silicon fab technology with a nanoscale dimensional control is complicated and costly. Therefore, according to the invention, a nanomaterial which can be grown directly into a long and slender nanotube or nanowire probe configuration is utilized for fabrication of the sidewall tracing nanoprobes. Nanowires such as carbon nanotubes have desirable mechanical flexibility and durability, and hence are desirable for the sidewall metrology applications.

The invention discloses desirable sidewall tracing nanoprobes which utilize sideway-protruding features such as a thicker catalyst particle or a modified catalyst particle at the end of a nanotube or nanowire stem. In order to impart a capability to perform metrology of sidewalls inside small trenches or via holes, the desired diameter of the nanotube or nanowire stem, which is insertable into the trenches or via holes, is typically in the range of 1-500 nm, preferably 2-100 nm, and even more preferably 2-50 nm. The desired degree of sideway protrusion in the nanoprobe structures of FIG. 1-FIG. 9 can be expressed in terms of the relative diameter of the catalyst particle vs that of the nanotube or nanowire stem to which the catalyst is attached. According to the invention, the average stem diameter is at least 5% smaller, preferably at least 10% smaller than the largest catalyst diameter (or width) measured in the lateral direction. The desired, lateral catalyst diameter or width is in the range of 2-200 nm, preferably in the range of 2-60 nm.

The sidewall tracing nanoprobes can be fabricated, according to the invention, by modifying the geometry and diameter/width of nanotubes or nanowires. Either a subtractive process or an additive process can be utilized. An exemplary method for fabricating such a nanoprobe by a subtractive process, i.e., by removing a portion of the material from the side wall of the nanowire or nanotube stem, is schematically illustrated in FIG. 2(a). In the drawing, the empty core cylinder of the carbon nanotubes or nanofibers is not shown for the sake of simplicity. Plasma etching (which is basically an ion etching) is one of the convenient techniques to remove atoms from the surface of a variety of inorganic material such as metals, ceramics, carbon, compounds such as carbides, nitrides or oxides. The plasma etching, for example, an oxygen plasma etching etches away carbon from the carbon nanotube exterior wall as the activated oxygen reacts with carbon and removes the carbon atoms, thus making the diameter of the carbon nanotube stem smaller as illustrated in the right side drawing of FIG. 2(a). The CNT diameter reduction makes the catalyst particle (such as Ni, Fe, Co, Pd) to protrude sideways, which then allows AFM sidewall tracing as depicted in FIG. 1(b).

Aside from carbon nanotubes or nanofibers, other nanotubes or nanowires such as silicon nanowires and ZnO nanowires can also be utilized and their sidewall diameter reduced for the desired nanoprobe fabrication, as these nanowires grow with Au-containing catalyst nanoparticles at the growing tip. The use of other nanotubes or nanowires for similar applications is not excluded.

It is, in general, desirable to have an AFM probe tip which is mechanically relatively strong and hard, so that the sharpness of the tip does not wear out too soon on repeated metrology operations. Pure metals, such as used for carbon nanotube nucleation and growth, Ni, Fe, Co, Pd, are, in general, mechanically soft. Therefore, the invention calls for an optional modification of the catalyst composition to be more wear-resistant by one of the three alternative means.

i). Use of a pre-alloyed catalyst for nanotube CVD growth—The $1^{st}$ approach is to employ an alloy catalyst rather than a pure metal catalyst for nanotube or nanowire synthesis. For example, instead of pure Ni, an alloy of Ni such as Ni-rich Ni—Fe, Ni—Co, Ni—Pd, Ni—Ti alloys, or a Ni-rich alloy containing one or more of many elements in the periodic table such as transition metals, can be deposited as catalyst before starting the nanotube growth using chemical vapor deposition (CVD) growth of nanotubes. The sidewall of the grown nanotube or nanowire probe is then plasma etched to reduce the stem diameter and form a desirable side-protruding edge at the probe tip.

ii). Surface metal coating followed by diffusional annealing—The $2^{nd}$ approach is to grow the carbon nanotube probe first, then modify the catalyst composition by subsequent processing, for example, by sputter, evaporation, or chemical vapor deposition of another metal that will form mechanically stronger alloy or intermetallic compounds, and then apply an annealing heat treatment (e.g., by heating to 300-1000° C. for 1-1000 minutes in an inert or reducing atmosphere) to allow diffusion of the catalyst metal with the coated metal to form an alloy or intermetallic compound. One or more of such a desired alloying element metal can be selected from Ti, Al, Zr, Hf, Ta, V, Mo, Si, Ge, Sb, Mg, Sn, Mn, etc. and allowed to alloy with the catalyst of Ni, Co, Fe, Pd, etc. for strengthening of the catalyst particle. If a suitable composition stoichiometry is selected, intermetallic compounds with specific ratio of the atoms being mixed can be formed at the tip of the nanoprobe. The intermetallic compounds are generally much harder than simple alloys, and hence are preferred as the tip material for the sidewall tracing nanoprobes. Either binary or ternary intermetallics (or even higher order intermetallics involving more than three metals) can be utilized.

Examples of desirable intermetallic alloy compositions for the specific exemplary case of the Ni catalyst include Ni—Al based intermetallics such as $Ni_3Al$, $Ni_2Al_3$, $NiAl$, $Ni_5Al_3$, $Ni_3Al$, Ni—Ge based intermetallics such as $Ni_3Ge$, $Ni_2Ge$, $NiGe$, Ni—Mg based intermetallics such as $NiMg_2$, $Ni_2Mg$, Ni—Mn based intermetallics such as $NiMn_3$, $Ni_3Mn$, $NiMn$, Ni—Sb based intermetallics such as $Ni_3Sb$, $Ni_7Sb_3$, $NiSb$, $NiSb_2$, Ni—Sn based intermetallics such as $Ni_3Sn$, $Ni_3Sn_2$, $Ni_3Sn_4$, Ni—Si based intermetallics such as $NiSi$, $NiSi_2$, Ni—Ti based intermetallics such as $NiTi_2$, $NiTi$, $Ni_3Ti$, Ni—V based intermetallics such as $Ni_8V$, $Ni_3V$, $Ni_2V$, $NiV_3$, Ni—Hf based intermetallics such as $Ni_5Hf$, $Ni_3Hf$, $NiHf$, $NiHf_2$, Ni—Zr based intermetallics such as $Ni_7Zr_2$, $Ni_5Zr$, $NiZr$, $NiZr_2$, Ni—Ta based intermetallics such as $Ni_8Ta$, $Ni_3Ta$, $Ni_2Ta$, $NiTa$, $NiTa_2$, and Ni—Mo based intermetallics such as $Ni_4Mo$, $Ni_3Mo$, $NiMo$. The alloy composition can be stoichiometric intermetallics or can be slightly off-stoichiometric intermetallics if some toughness and cracking-resistance is desired in addition to the mechanical strength/hardness and wear-resistance.

Of various intermetallics, the NiTi composition intermetallic is one of the particularly desirable materials as it exhibits the shape memory alloy characteristics with high mechanical strength as well as mechanical toughness. The fact that the NiTi intermetallic has some ductility and is not as brittle as most of the intermetallics is an advantage as a tip surface material because the danger of breaking off the tip end is minimized.

Figure 2:
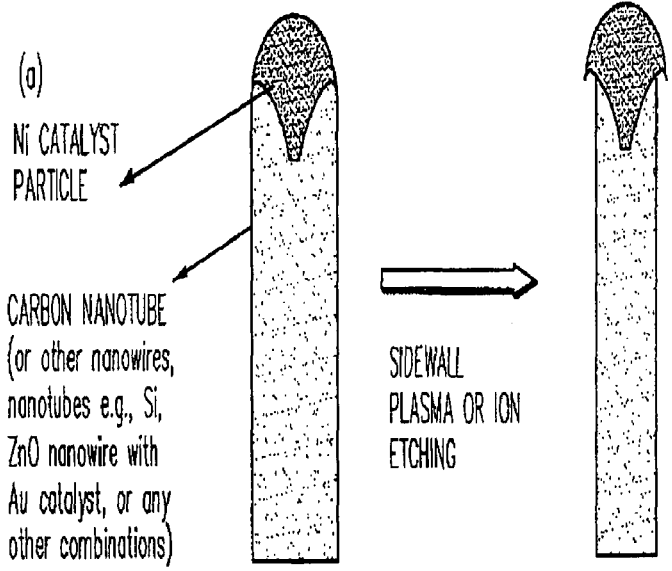
FIG. 2 schematically illustrates an ion-etch based subtractive process for fabrication of sidewall tracing AFM probes. (a) By reducing the carbon nanotube outside diameter using ion etch or plasma etch, (b) By alloy-hardening the catalyst first and then sidewall etching.
Figure 2:
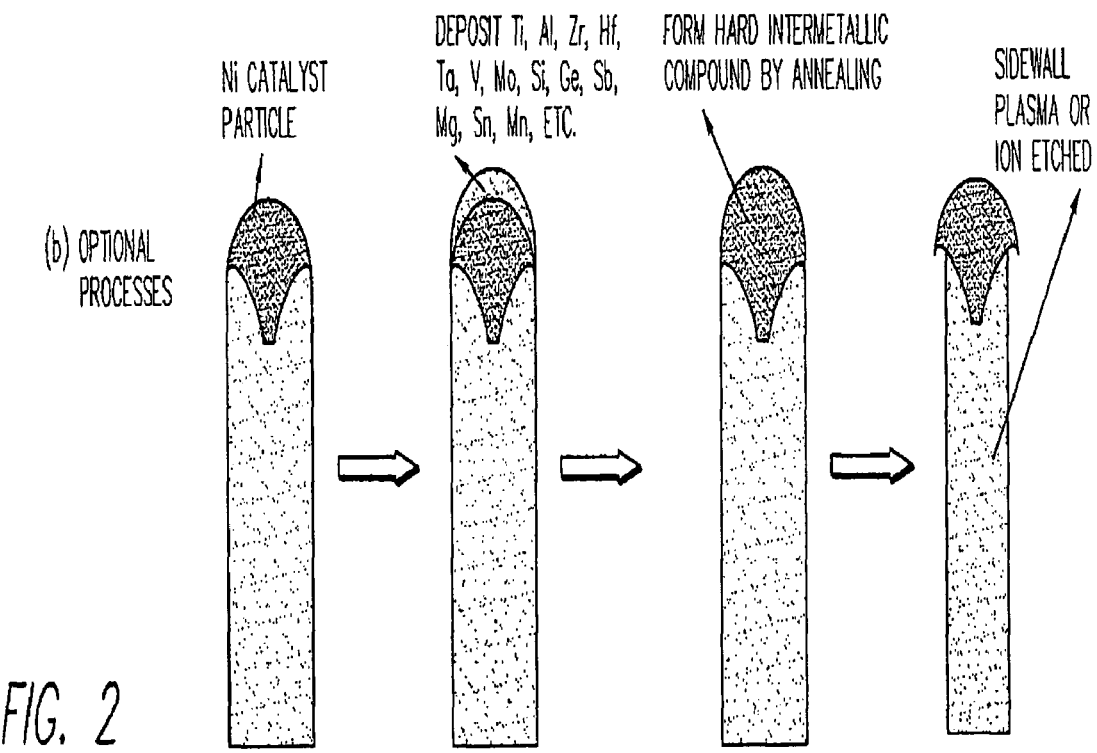
Figure 3:
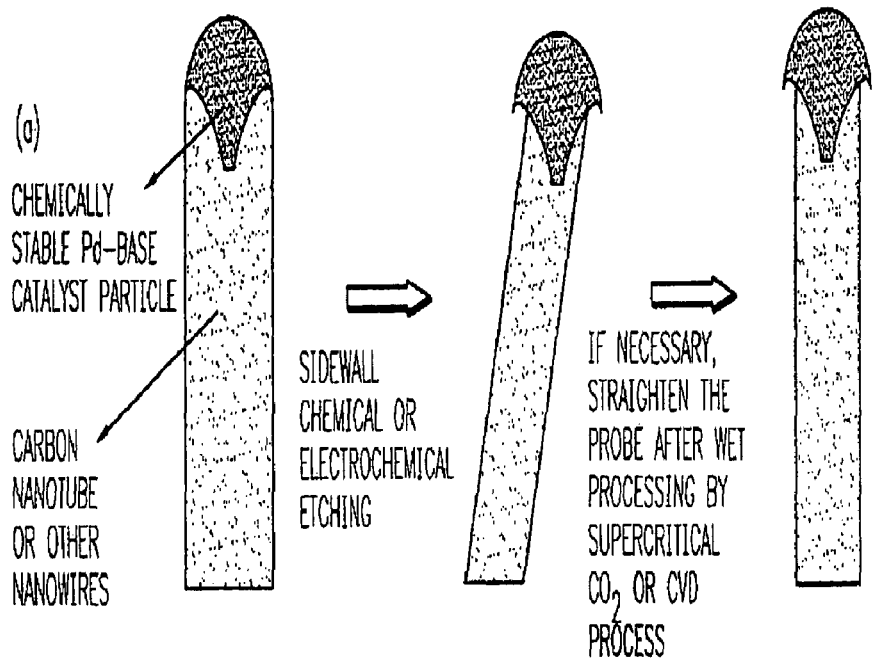
FIG. 3 illustrates a chemical-etch-based subtractive process for fabrication of sidewall tracing AFM probes. (a) By reducing the carbon nanotube outside diameter using sidewall chemical etching and, (b) By alloy-hardening the catalyst first and then sidewall etching.
Figure 3:
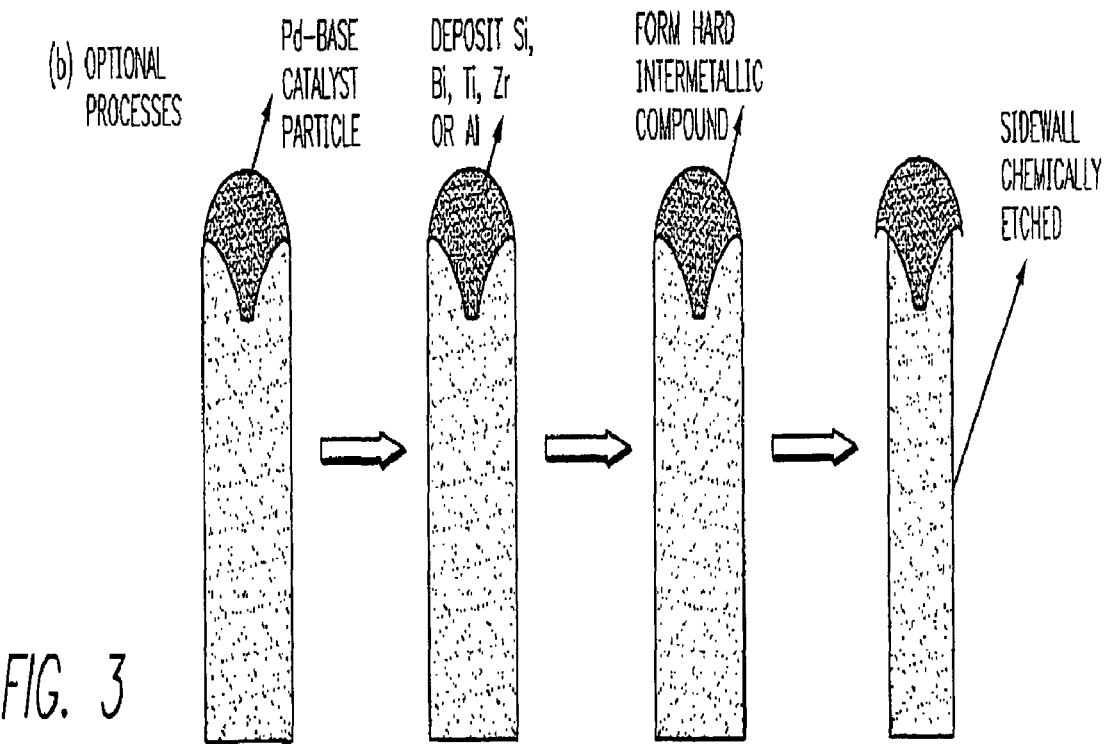
Figure 7:
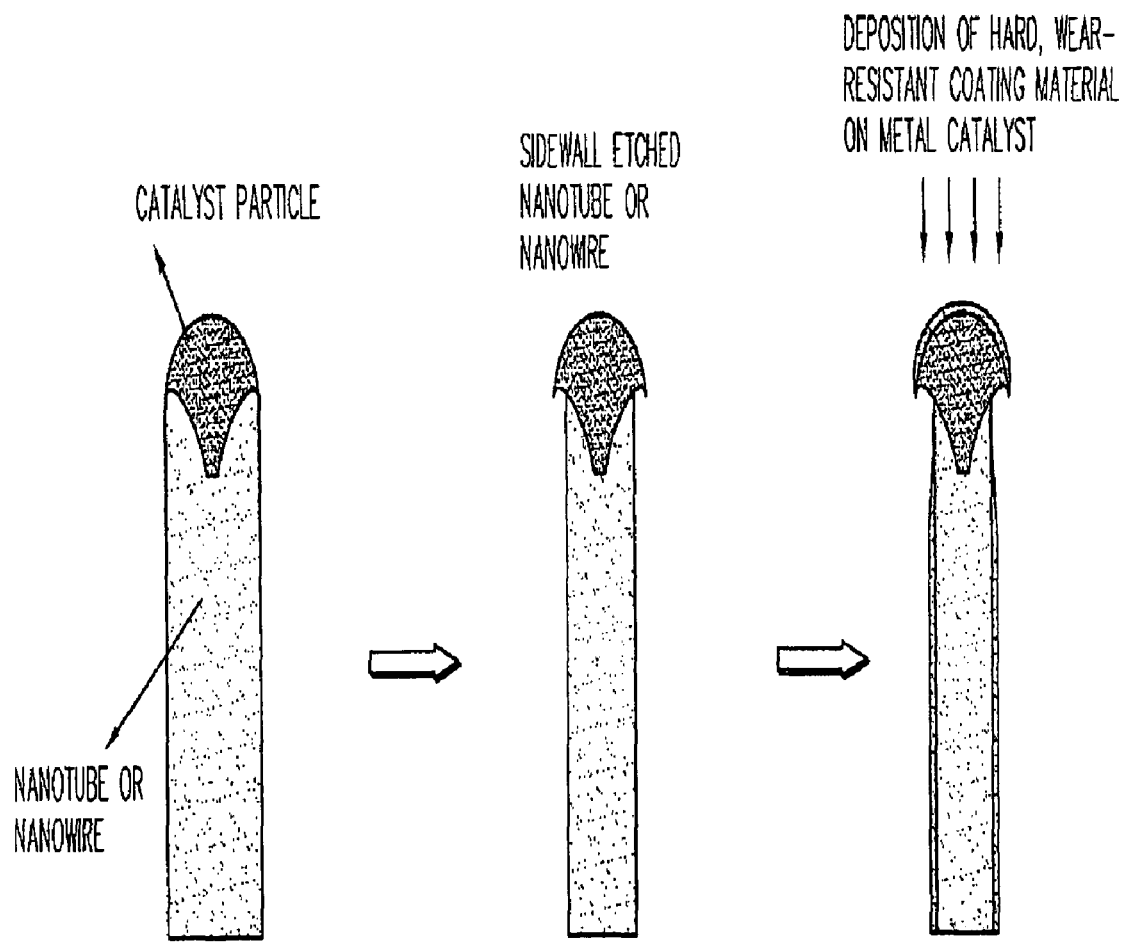
FIG. 7 depicts yet an alternative embodiment to form a desirable side-protruding edge at the probe tip by etching of the sidewall, and then coating the catalyst particle surface by wear-resistant material.

Likewise, for specific Fe-base catalyst particles or Co-base catalyst particles, a variety of wear-resistant Fe-base intermetallic compounds or Co-base intermetallic compounds can be formed by depositing various alloying elements on the catalyst particle surface as illustrated in FIG. 2, followed by diffusional annealing heat treatment. For availability of useful alloy composition range and intermetallics compositions, see "*Binary Alloy Phase Diagram*", edited by T. B. Massalski, $2^{nd}$ ed. ASM International, Metals Park, Ohio, 1991. The sidewall of so-processed nanotube or nanowire probe is then plasma etched to reduce the stem diameter and form a desirable side-protruding edge at the probe tip.

iii). Wear-resistant coating—The $3^{rd}$ approach is to first prepare the standard, equi-diameter, vertically positioned carbon nanotube probe by CVD growth, then partially etch away and reduce the probe stem diameter to form a desirable side-protruding edge at the probe tip, and then coat the catalyst particle surface by a layer of wear-resistant material. This embodiment is schematically illustrated in FIG. 7. The desirable wear-resistant coating can be sputter-deposited, evaporation-deposited, CVD-deposited, or electrochemically deposited. The hard coating material can be selected from a list of materials including carbides, nitrides, oxides, fluorides, or intermetallics. Some examples of useful wear resistant materials include carbide materials (e.g., WC, TiC, ZrC, HfC, TaC, NbC, VC, $Cr_2C_3$, $Mo_2C$, $Fe_3C$), nitrides (e.g., AlN, BN, $Cr_2N$, $Fe_4N$, $Si_3N_4$, TiN, TaN, ZrN, VN), oxides (e.g., $Al_2O_3$, $SiO_2$, $Cr_2O_3$, $TiO_2$, $V_2O_3$, ZnO, ZrO, mechanically more tough and less brittle yttrium-stabilized ZrO, and rare earth oxides). The carbide, nitride, oxide, fluoride and other compound coating materials containing reactive elements such as Ti, Al, Cr, Zr, Ta, or rare earths generally adhere well on a substrate during thin film deposition.

Mechanically hard intermetallic compounds can also be used as a coating material, which can be selected from a variety of compounds described above, for example, $Ni_3Al$, NiTi, $Ni_3Ta$, $NiZr_2$, etc. The use of hard and relatively noble metal coating (such as Rh and its alloys) is not excluded. In the case of carbon nanotubes, the nanotube stem provides the desirable mechanical strength, toughness and flexibility to minimize breaking or fracturing of the nanoprobe stem while the hard coating provides the desired wear-resistance for the sideway protruding tip.

Instead of the plasma etching, chemical etching method can be utilized to enable the subtractive processing of reducing the diameter of the nanotube or nanowire and fabricate the sideway-protruding, sidewall tracing nanoprobes. This approach is applicable to any combination of the catalyst particle material and the nanowire/nanotube materials as long as the catalyst particle material is more resistant to chemical etching than the nanotube or nanowire material.

Figure 10:
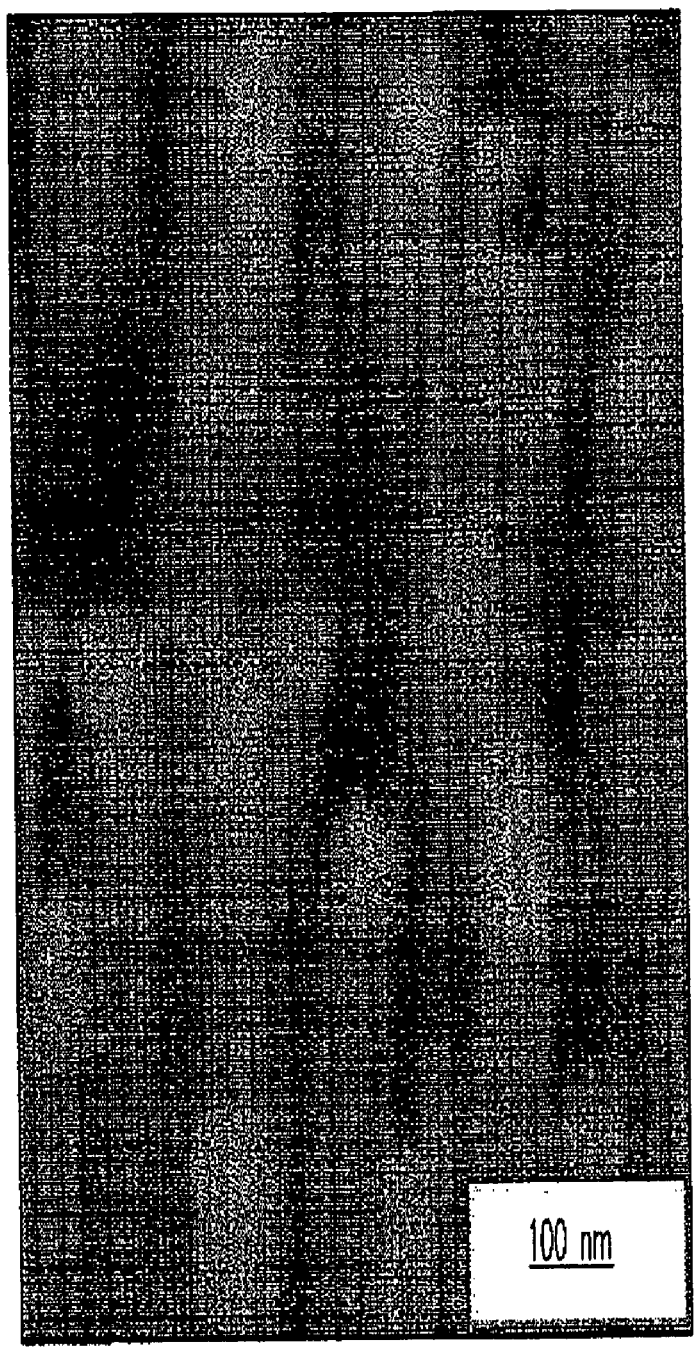
FIG. 10 represents an SEM micrograph showing carbon nanotubes grown with Pd catalyst nanoparticles.

If the catalyst material used for carbon nanotube growth is Ni, Co or Fe, the carbon nanotube stem itself would be chemically or electrochemically more stable than the Ni, Co or Fe catalyst particle, and hence this subtractive method of preferentially reducing nanotube diameter is not likely to work. However, if the catalyst particle material is noble, for example, Pt, Pd (an example growth of Pd-based carbon nanotubes is shown in FIG. 10), or alloys containing these metals, the graphite and carbon material on the nanotube wall can preferentially be etched by acids (such as sulfuric acid) using either simple chemical etching or electrochemical etching under applied voltage, at a substantially faster rate than the Pd catalyst material, with the end result of nanotube sidewall etching and diameter reduction. The sideway-protruding catalyst particle configuration as a result of such differential etching is illustrated in FIG. 3(a). As wet processing often causes the nanotubes to fall, tilted, or agglomerate (if there are many nanotubes on the substrate), it is therefore desirable to apply an extra step of processing to straighten and make the nanoprobe vertically positioned if necessary. For nanotube straightening, either a supercritical $CO_2$ drying process or re-growth CVD process at high temperature (e.g., 300-1000° C.) can be applied.

An optional alternative process in the fabrication of the side-protruding, sidewall tracing nanoprobes using Pd type noble catalyst is illustrated in FIG. 3(b). Here one or more alloying elements are deposited on the top surface of the Pd catalyst particle, with exemplary elements like Si, Ge, Bi, Ti, Zr, V, Mn, Mg, In, Sb, Sn, Zn, Fe, Mo, or Al, which are known to form Pd-based alloys or intermetallics upon diffusional annealing at 300-1000° C. Once the intermetallics are formed on the surface of the catalyst tip, stronger/harder and wear-resistant mechanical property characteristics will be provided to the surface of the sidewall tracing AFM tip.

If the nanowires or nanotubes for the sidewall tracing nanoprobe are based on a material other than carbon nanotubes, the relative chemical (or electrochemical) stability in relation to the relative etchability of the nanoprobe wall vs catalyst particle becomes somewhat different. For example, Si nanowires with Au-rich catalyst particles at the tip would respond to a KOH type etching solution with preferential reduction of the Si nanowire diameter than the catalyst size reduction. Similarly, a ZnO nanowire with a Au-rich catalyst particle at the tip would respond to an acid with a more pronounced etching and reduction of the nanowire stem diameter rather than the size of the catalyst. According to the invention, the surface of the Au-rich catalyst particles at the tip of various other types of nanowires such as Si or ZnO nanowires can also be hardened by alloying approach, similarly as in the case of carbon nanotube case described above, either by depositing another metal on the top surface of the Au-rich catalyst and diffusion annealing to form an alloy or Au-based intermetallics, or by sputter or evaporation deposition of a hard coating such as carbides (WC, TiC, ZrC, HfC, TaC, NbC, VC, $Cr_2C_3$, $Mo_2C$, $Fe_3C$), nitrides (such as AlN, BN, $Cr_2N$, $Fe_4N$, $Si_3N_4$, TiN, TaN, ZrN, VN), oxides ($Al_2O_3$, $SiO_2$, $Cr_2O_3$, $TiO_2$, $V_2O_3$, ZnO, and rare earth oxides). The carbide, nitride, oxide, fluoride coating materials containing reactive elements such as Ti, Al, Cr, Zr, Ta, generally adhere well on a substrate on thin film deposition. Mechanically hard intermetallic compounds can also be used as a hard coating material, such as $Au_3Sn$, AuSn, $AuSn_2$, $AuSn_4$ intermetallics. Also, the use of hard and relatively noble metal coating (such as Rh and its alloys) is not excluded.

While in general any mechanically hard coating material can be utilized for enhancing the wear-resistance of the sidewall tracing probe tip, it is preferred that the coating material selected has one or more common elements with the catalyst material in order to ensure strong adhesion of the coating onto the catalyst particle. For example, in the case of for Au-rich catalyst, a $Au_3Sn$ type intermetallic compound can be sputter deposited on the surface of Au catalyst particle. Because of the presence of common metal, i.e., Au, in this case, the adhesion of such intermetallics coating on Au catalyst surface is expected to be strong. Likewise, for hard coating of Ni, Co, Fe, Pd catalyst particles, intermetallic compounds containing the same metal is preferred for the sake of improved adhesion.

Figure 4:
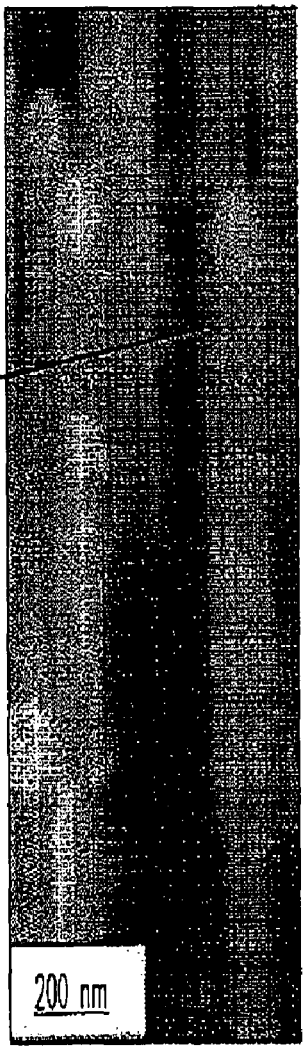
FIG. 4 represents scanning electron micrographs of vertically aligned, DC plasma CVD carbon nanotubes, (a) before vs (b) after oxygen plasma etching for 1.5 minute at a power level of 200 watt.
Figure 4:

Shown in FIG. 4 are scanning electron microscope pictures of carbon nanotubes before (FIG. 4(a)) vs after plasma etching (FIG. 4(b)). The carbon nanotubes were fabricated by CVD growth using Ni catalyst. The growth of vertically aligned arrays of carbon nanotubes was carried out by a DC Plasma enhanced chemical vapor deposition (PECVD) process using Ni catalyst particles with a tip-growth mechanism, which is described in detail elsewhere. A 5-10 nm thick Ni film was sputter deposited on Si substrate, which was then spheroidized into particles during CVD growth at ~700° C. A mixed gas of ammonia ($NH_3$) and acetylene ($C_2H_2$) was used. A DC bias of 550 V was applied between an anode above the sample and a cathode just below the sample. Under the applied voltage, plasma formed and $C_2H_2$ was added to the chamber flowing at 30 sccm with the total $NH_3$ and $C_2H_2$ pressure held at 3 torr. For description of the DC Plasma enhanced chemical vapor deposition (PECVD) process, see an article by Aubuchon et al, *Nano Lett.* 4, 1781 (2004), and an article by I-Chen Chen et al. *Appl. Phys. Lett.* 88, 153102 (2006).

The plasma etching was carried out using an oxygen plasma at a power of 200 watt for various durations. As shown in FIG. 4(b), one and a half minute of plasma etching was sufficient to etch away the sidewall of carbon nanotubes (or nanofibers) and make the catalyst particle protrude sideway. For the given power level, the desired plasma etching time is in the range of 0.1-10 minutes, preferably in the range of 0.5-5 minutes. Care should be taken to avoid a too extensive plasma etching, as this will make the nanotube wall zagged, or make the nanotubes bend or break-up into pieces.

Instead of Fe, Ni, or Co, a relatively noble catalyst metal such as Pd and its alloys can also be utilized for carbon nanotube growth. An example of such Pd based carbon nanotubes, using a similar DC plasma enhanced CVD processing described above, is shown in the SEM micrograph of FIG. 10.

Figure 5:
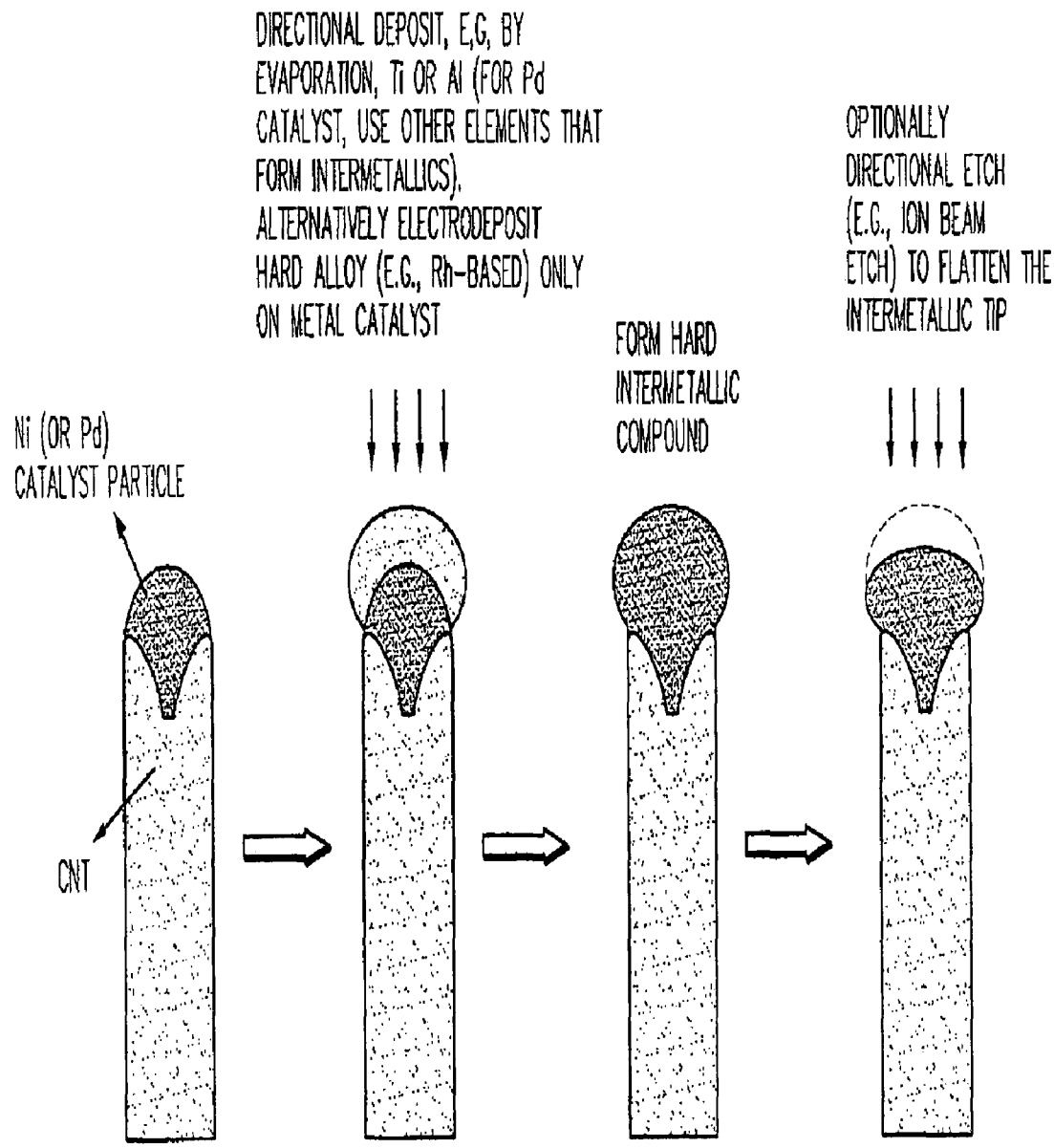
FIG. 5 schematically illustrates an additive process for fabrication of sidewall tracing AFM probes by depositing more metallic material on the catalyst particle, and optional additional processing of alloy-hardening or flattening of the catalyst particle.

Referring to the drawings, an additive processing, instead of subtractive processing, can also be employed to fabricate the desired sideway-protruding, sidewall tracing nanoprobes. An example is illustrated in FIG. 5. In principle, any mechanically durable metal, solution-annealed alloy, precipitation-hardened alloy, strong nano-grained alloy, intermetallic compound, or mechanically hard carbide, nitride, oxide, fluoride, etc. can be deposited on top of the catalyst particle surface using sputtering, evaporation, CVD deposition, chemical, or electrochemical deposition. A subsequent diffusional anneal may be used to form a hard alloy or compound, or alternatively a metal-containing compound composition can be directly deposited, with an optional post-deposition heat treatment for optimization of crystallization, phase distribution and microstructural control.

The increase in the diameter of the catalyst particle is maximized by such an additive process if the angle of the deposition is controlled to be nearly parallel to the nanowire or nanotube stem axis. The desired deposition angle relative to the axis of the nanoprobe is preferably less than 20 degrees, preferably less than 10 degrees. Such an additive process of material deposition on catalyst particle makes the catalyst tip become wider than the nanotube stem, thus enabling the catalyst particle to serve as sidewall tracing nanoprobe tip.

Optionally, the height of the catalyst particle at the probe tip can be reduced to provide a sharper sidewall probing, as illustrated in the far right schematic in FIG. 5. The coating, either for the intended diffusion annealing or as a direct hard coating, can be deposited either before or after sidewall diameter reduction by, e.g., plasma etching, chemical etching, or electrochemical etching as illustrated by various drawings of FIGS. 2, 3, 5, 6, and 7.

Figure 6:
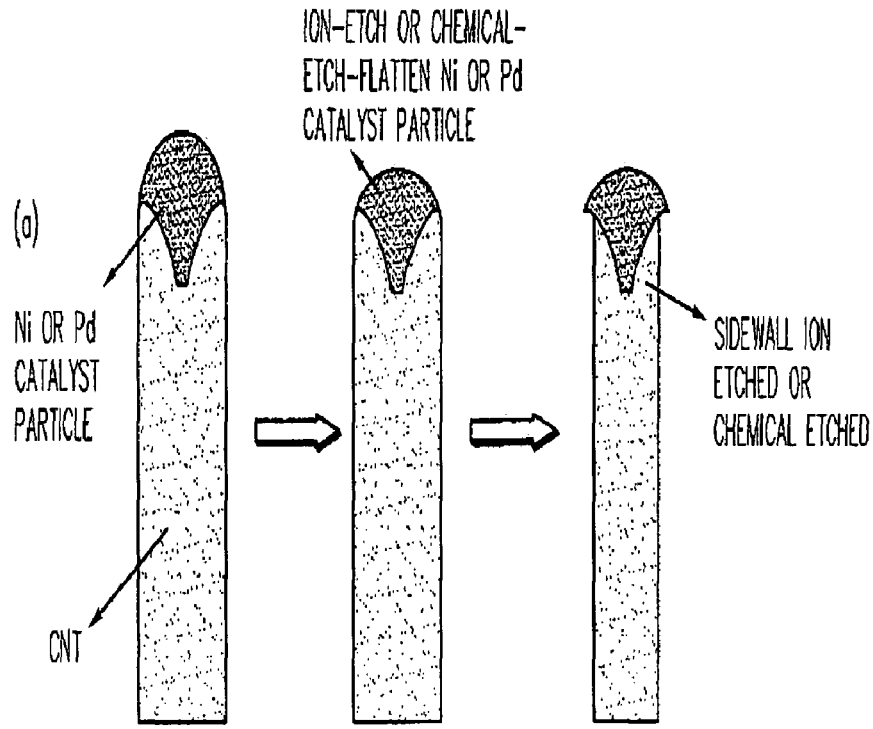
FIG. 6 schematically illustrates an alternative embodiment of subtractive process for fabrication of sidewall tracing AFM probes using (a) a catalyst flattening step first followed by a sidewall etching process, and (b) with an optional alloying-hardening of the catalyst particle.
Figure 6:
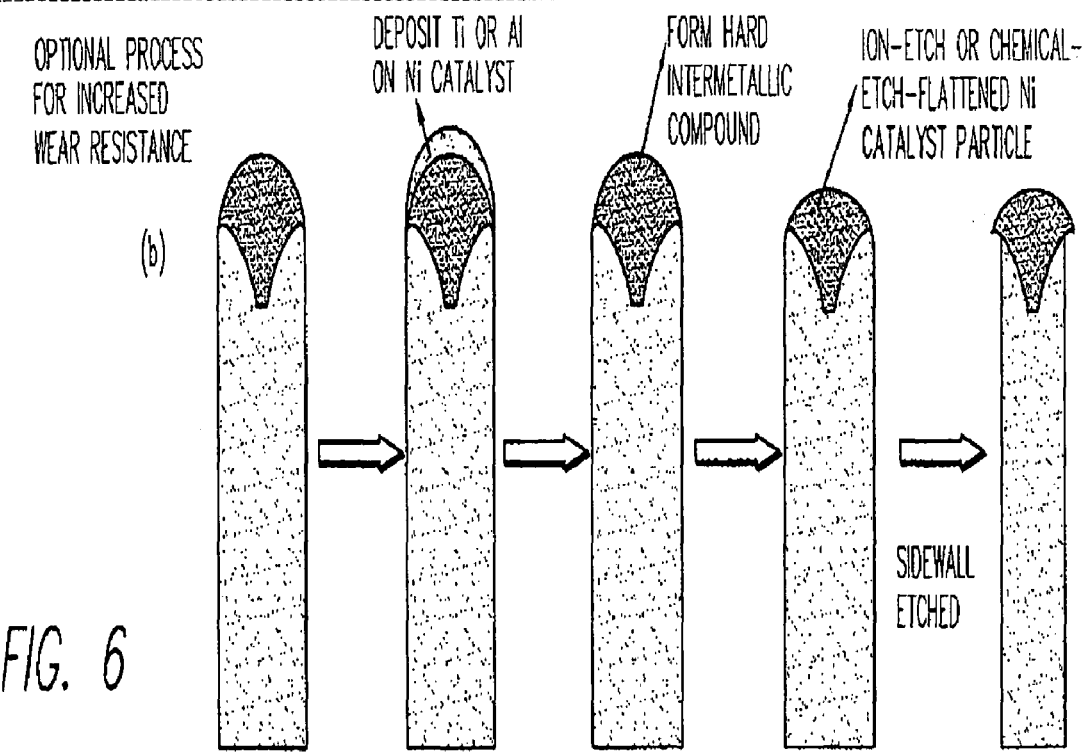

Another variation of the embodiment in this invention to make the sidewall tracing nanoprobes, is a combination of more than one subtractive processing steps and possibly with some additive processing as well. Some examples of such combined steps are illustrated in FIG. 6 and FIG. 7. In the drawing of FIG. 6(a), catalyst flattening subtractive step and carbon nanotube sidewall diameter-reducing subtractive step are combined. A chemical etch, electrochemical etch, a directional ion etch, a selective ion etch (by using ion etch species which preferentially etch metal over carbon nanotube material) is used first to flatten the catalyst particle such as Ni, Fe, Co, Pd, and alloys or intermetallics of these elements. In the following step, the sidewall of the nanowire, such as carbon nanotubes, is processed to reduce the stem diameter and make the catalyst protrude sideways. An intermediate step of optionally adding alloying element (such as Al or Ti) and diffusional annealing to modify the composition of the catalyst particle to produce more wear-resistant material surface is shown in FIG. 6(b).

Shown in FIG. 7 is another variation of the embodiment for preparing a wear-resistant nanoprobe with a sidewall tracing capability. The nanowire or nanotube with a catalyst particle is first subjected to sidewall etching, then a hard, wear-resistant coating material is deposited on the metal catalyst. The wear-resistant coating material can be selected from a list of materials including carbides, nitrides, oxides, fluorides, or intermetallics as discussed above. The deposition of hard coating is preferably carried out from the vertical direction, so that the undesirable deposition of the coating material on stem sidewall is minimized.

Figure 8:
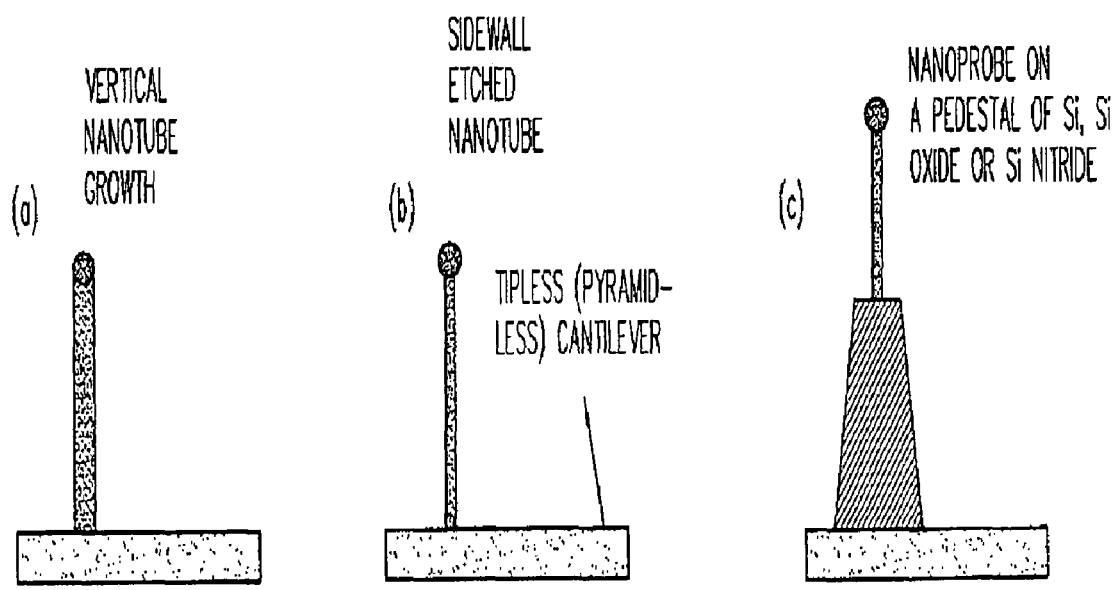
FIG. 8 schematically illustrates an exemplary variation of the embodiment for sidewall tracing AFM probe with (a) a nanowire or nanotube probe grown and sidewall etched as placed either (b) on a flat cantilever, or (c) on a Si type microfabricated pedestal.

Referring to the drawings, FIG. 8 schematically illustrates alternative placements/configurations of sidewall-tracing probes. As shown in FIG. 8(a), a vertical nanotube nanoprobe is first CVD grown on a tipless cantilever (meaning a pyramid-less cantilever). Then either the catalyst is made larger or the sidewall is etched to a smaller diameter to prepare a sidewall tracing probe, as shown in FIG. 8(b). Alternatively, a pedestal (e.g., made of Si, $SiO_2$ or $Si_3N_4$) can be pre-fabricated on the AFM cantilever, and then the sidewall tracing probe is CVD grown on top of the height-extending pedestal as depicted in FIG. 8(c) so that the access to various trenches and via holes is made easier. A catalyst island can be defined and placed on the pedestal surface before the CVD growth of carbon nanotubes, using various island defining techniques, such as the catalyst film deposition followed by e-beam lithography or electron beam induced deposition (EBID) of carbon mask. See an article by Chen et al, *Appl. Phys. Lett.* 88, 153102 (2006) mentioned above. Various modified or optional alloying, coating and other processing techniques, described in this invention earlier, can also be utilized to make the catalyst tip in FIG. 8(c) more wear-resistant or to make the edge protrusion sharper.

Figure 9:
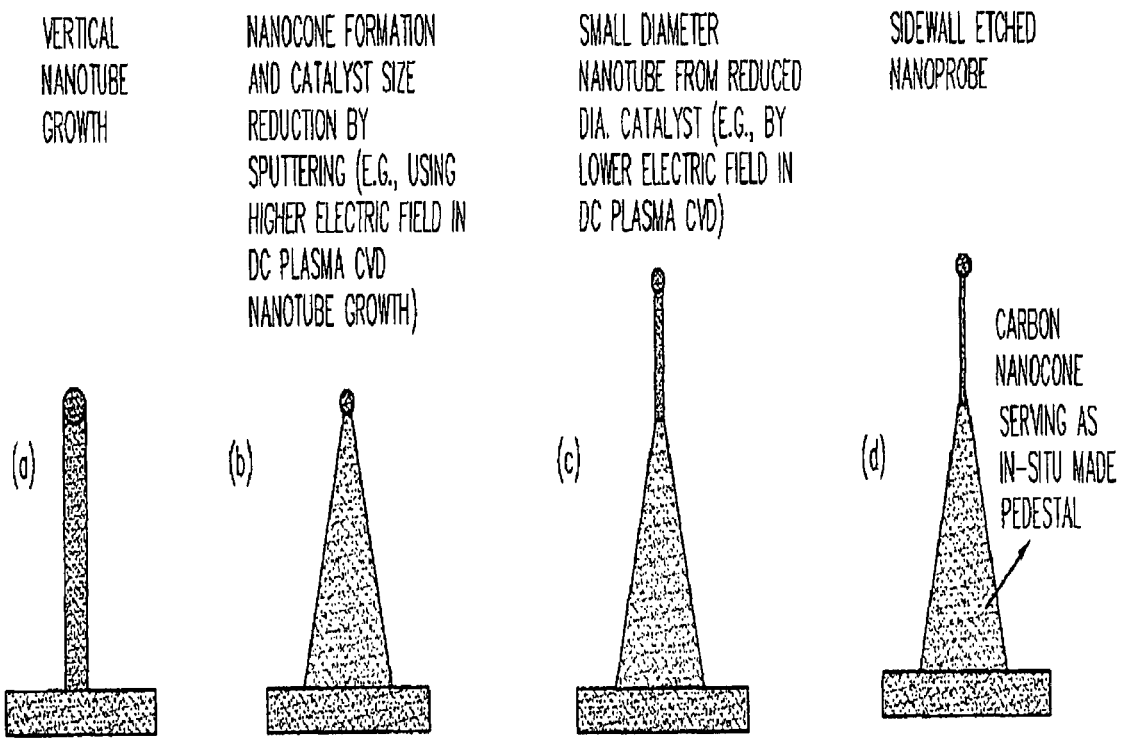
FIG. 9 illustrates an exemplary sidewall tracing probe on in-situ-made carbon nanocone pedestal.

Instead of using a pre-fabricated pedestal for the placement of the sidewall-tracing nanoprobe, an in-situ fabricated carbon nanocone itself can be utilized as the height-extending pedestal as illustrated in FIG. 9. The first step is to add a catalyst particle (e.g., Ni) on a tipless AFM cantilever and grow a nanocone shaped vertical nanotube as shown in FIG. 9(a) and (b). This is accomplished by employing a higher electric field in DC plasma CVD nanotube growth, e.g., 550-600 volts/cm. For examples of experimental processing steps, see articles by L.-H. Chen et al, "Control of Carbon Nanotube Morphology by Change of Applied Bias Field During Growth", *Appl. Phys. Lett.* 85, 5373 (2004), and by I-Chen Chen et al., "Extremely sharp carbon nanocone probes for atomic force microscopy imaging", *Appl. Phys. Lett.* 88, 153102 (2006).

During the early stage of CVD growth processing, an equi-diameter carbon nanotube grows first, FIG. 9(a), which is gradually converted to a nanocone geometry as the diameter of the catalyst size is gradually reduced by sputtering away some of the metal atoms off the catalyst particle in the presence of the high electric field DC plasma. It is well known that the diameter of a carbon nanotube is determined by the diameter of the catalyst particle. The gradually reducing catalyst diameter therefore results in a carbon nanocone formation, FIG. 9(b). After a suitably sized nanocone is grown during the CVD process, but with a smaller diameter catalyst particle still remaining at the tip, the applied electric field in the plasma is then reduced (e.g., from 550-600 volts/cm to 450-500 volts/cm) and the CVD growth of the nanotube, an equi-diameter nanotube this time, is continued so as to produce an in-situ-made pedestal structure having an additional, small diameter nanoprobe on top. This is schematically depicted in FIG. 9(c). Therefore a costly and complicated pre-fabrication step for the height-extending pedestal structure is thus omitted. Finally, a diameter-reducing etch process (e.g., by either plasma etch, chemical etch, or electrochemical etch) is applied to make the catalyst particle protrude sideways. Various modified or optional alloying, coating and other processing techniques described in this invention earlier can be utilized to make the catalyst tip in FIG. 9(d) more wear-resistant or to make the edge protrusion sharper.

The desired height of the in-situ-made, carbon nanocone pedestal structure is in the range of 0.1-50 micrometers, preferably 0.5-5 micrometers. The desired base diameter of the nanocone is in the range of 0.05-5 micrometers, preferably 0.2-2 micrometers.

As described earlier, the desired degree of sideway protrusion in the pedestal-structured nanoprobe structures of FIGS. 8 and 9 can be expressed in terms of the relative diameter of the catalyst particle vs that of the nanotube or nanowire stem. According to the invention, the desired average stem diameter is at least 5% smaller, preferably at least 10% smaller than the largest catalyst diameter (or width) measured in the lateral direction. The desired, lateral catalyst diameter or width is in the range of 2-200 nm, preferably in the range of 260 nm.

Yet another embodiment of the sidewall tracing nanoprobe, according to the invention, is based on double-bent or multiple-bent carbon nanotubes. A probe tip based on such configurations enables the sidewall metrology on both the left and right side of the tip, or toward multiple lateral orientations as illustrated in FIG. 1(b).

Figure 11:
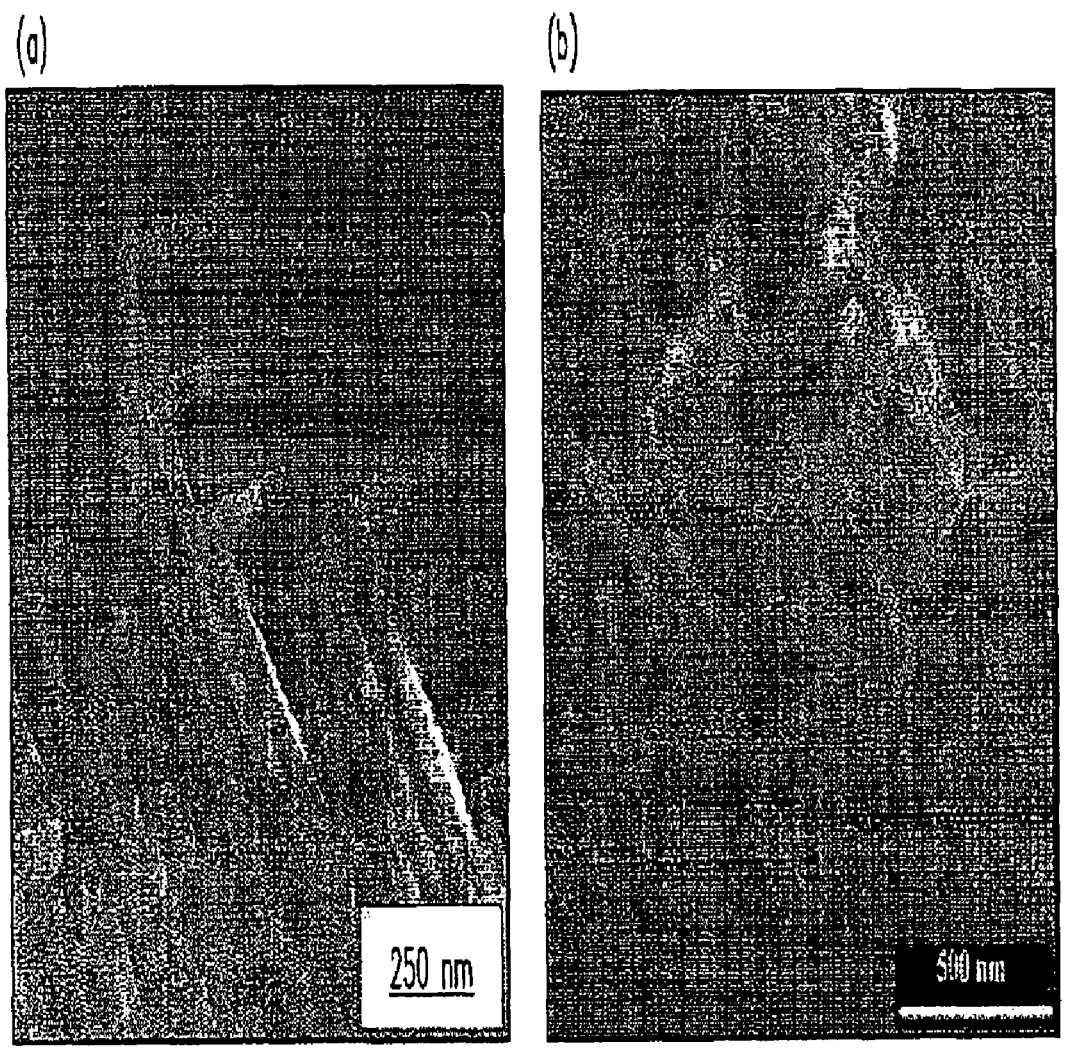
FIG. 11 shows SEM micrographs of bent carbon nanotubes, (a) 900 bent,
(b) zig-zag bent.

It has been shown that the growth direction of nanotubes can be abruptly altered in the middle of the CVD growth by using intentionally applied electric field near the intersection of two conductors. See Aubuchon et al, "Multiple Sharp Bending of Carbon Nanotubes during Growth to Produce Zig-Zag Morphology" *Nano Lett.* Vol. 4, page 1781-1784 (2004). By altering the electric field direction from the recessed corner of conductor plates, the nanotube growth direction can be sharply re-directed to any desired new direction to form a CNT with a bent-tip or a zig-zag configuration as shown by SEM microscope pictures of FIGS. 11(a) and (b).

Figure 12:
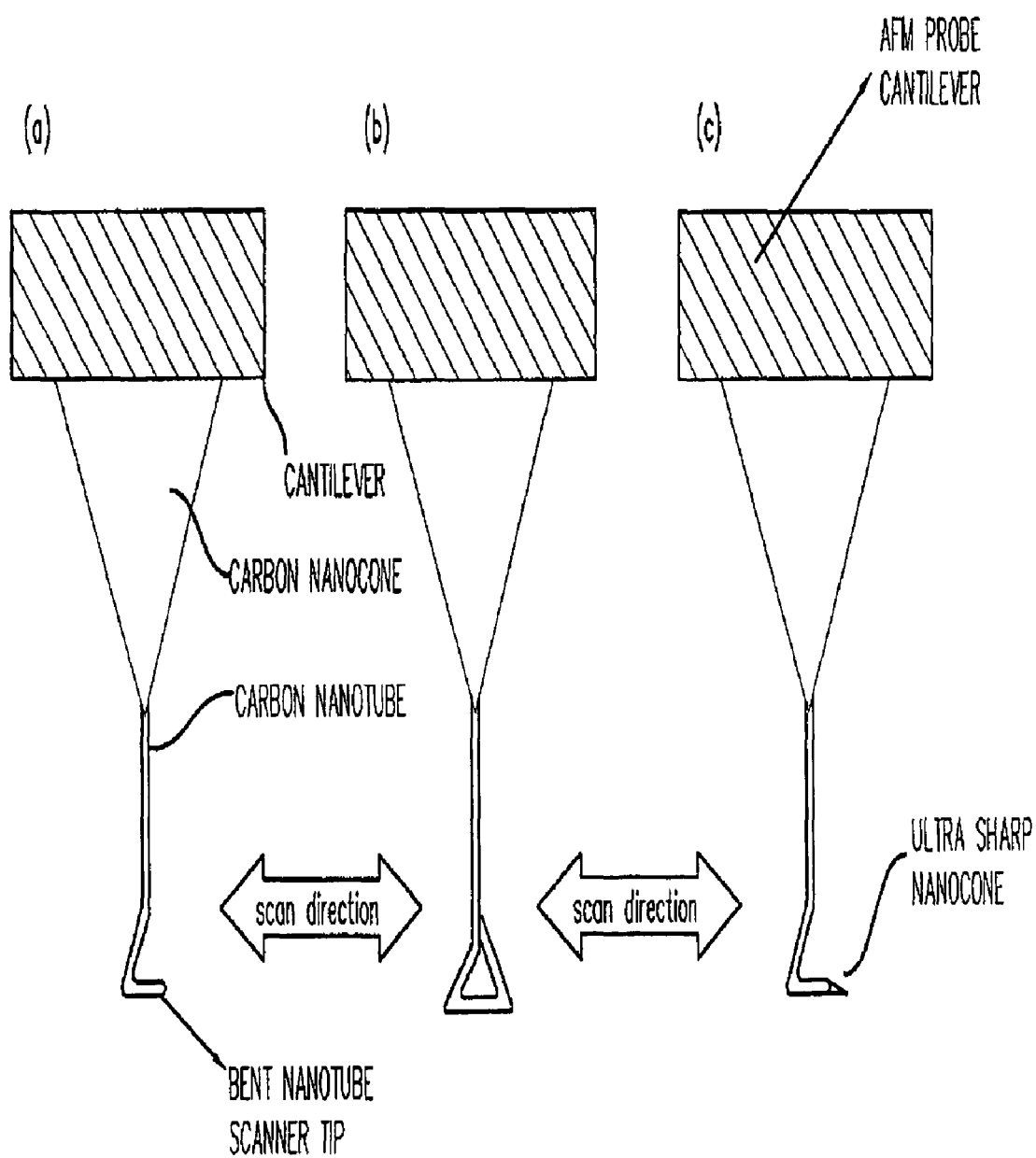
FIG. 12 schematically illustrates sidewall tracing AFM probes with multiple bent nanotube tip with (a) double-bent, (b) triple-bent, (c) sharpened tip configuration at the end of the probe.

Utilizing such bent carbon nanotubes, a multiple-direction-traceable, sidewall scanning probe tip of coat-hanger configuration is designed, according to the invention. This is schematically illustrated in FIG. 12, which represents a more complex version of FIG. 1(b) concept. Such a probe tip has at least two bends as illustrated in the FIG. 12(a) or (b). The very end of the last segment of the multiple-bent nanotube can have catalyst particle at the tip as depicted in FIG. 12(a) or can be made sharper by gradually removing the catalyst particle from the tip, FIG. 12(c) by sputter etch during the course of CVD growth processing of the last segment carbon nanotube.

Figure 13:
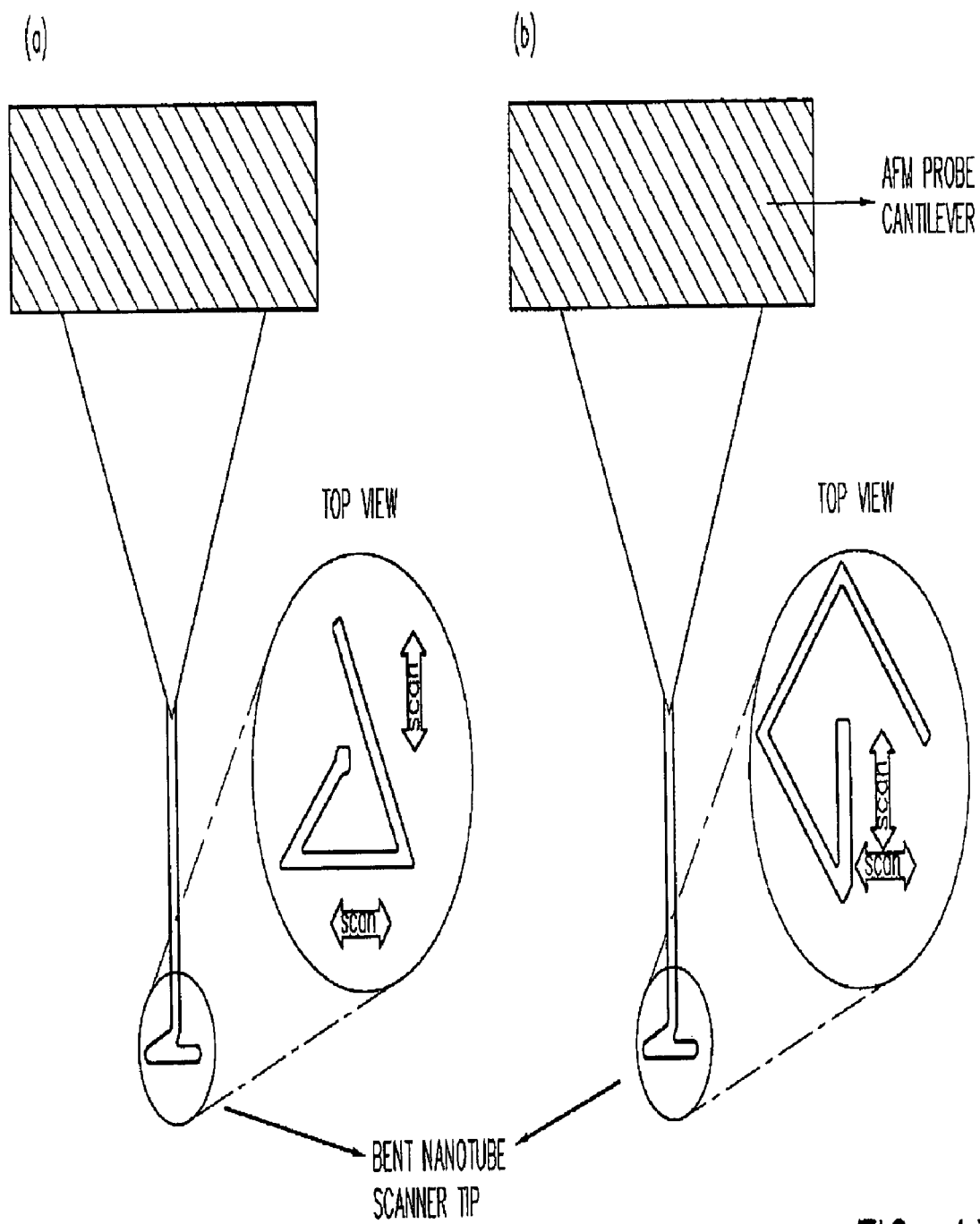
FIG. 13 illustrates bent nanotube scanner tip with (a) three-way protrusion, (b) four-way protrusion.
Figure 14:
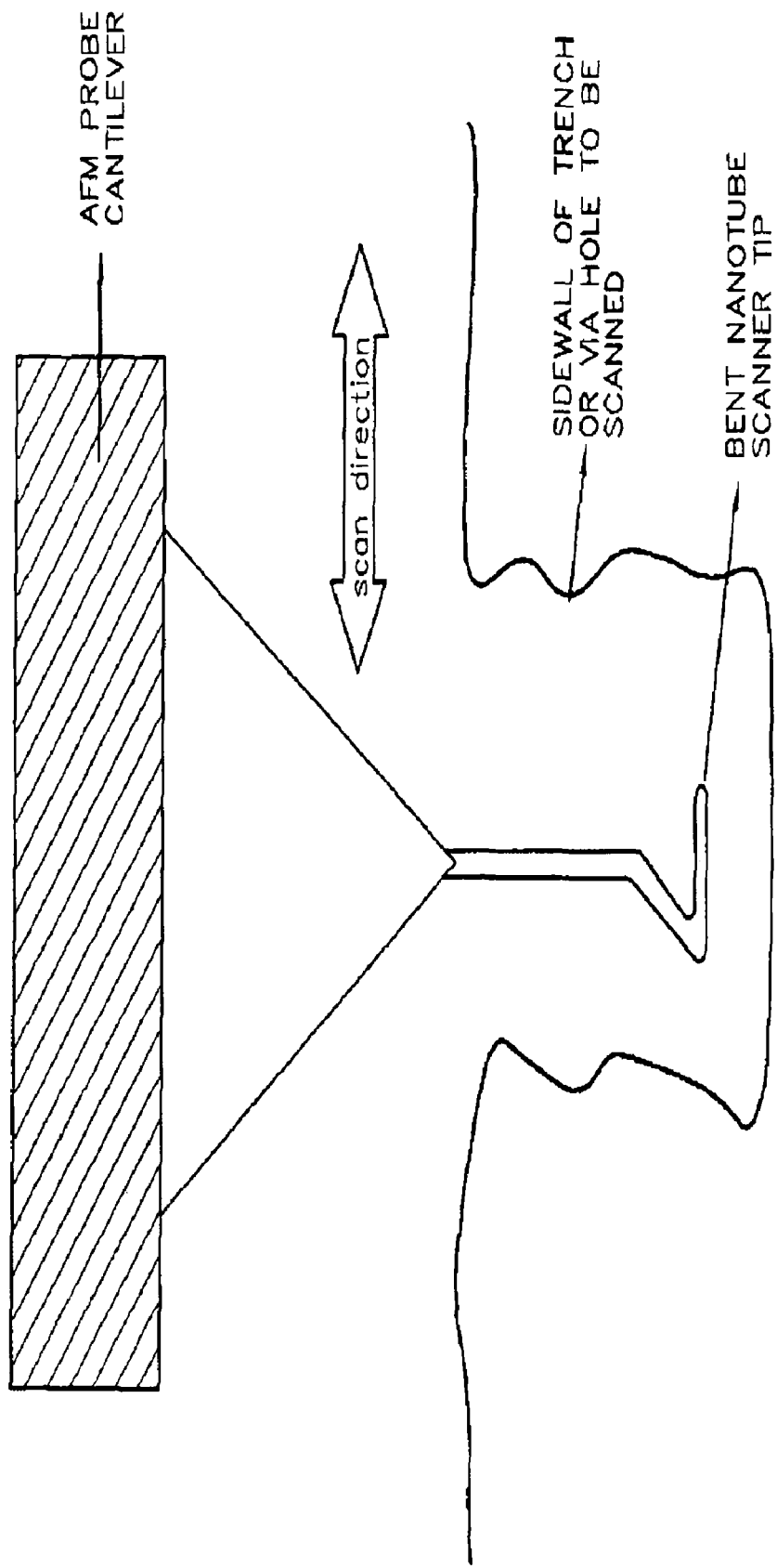
FIG. 14 schematically illustrates an AFM probe with a double-bent CNT tip with a sidewall tracing capability in trenches or via holes.

Examples of multiple-bent carbon nanotubes to allow sidewall tracing at three or four differently oriented surfaces are illustrated in FIG. 13(a) and (b). Such bent-nanotube probe tips of FIGS. 12 and 13 allow scanning of sidewalls having re-entrant features as illustrated in FIG. 14.

Figure 15:
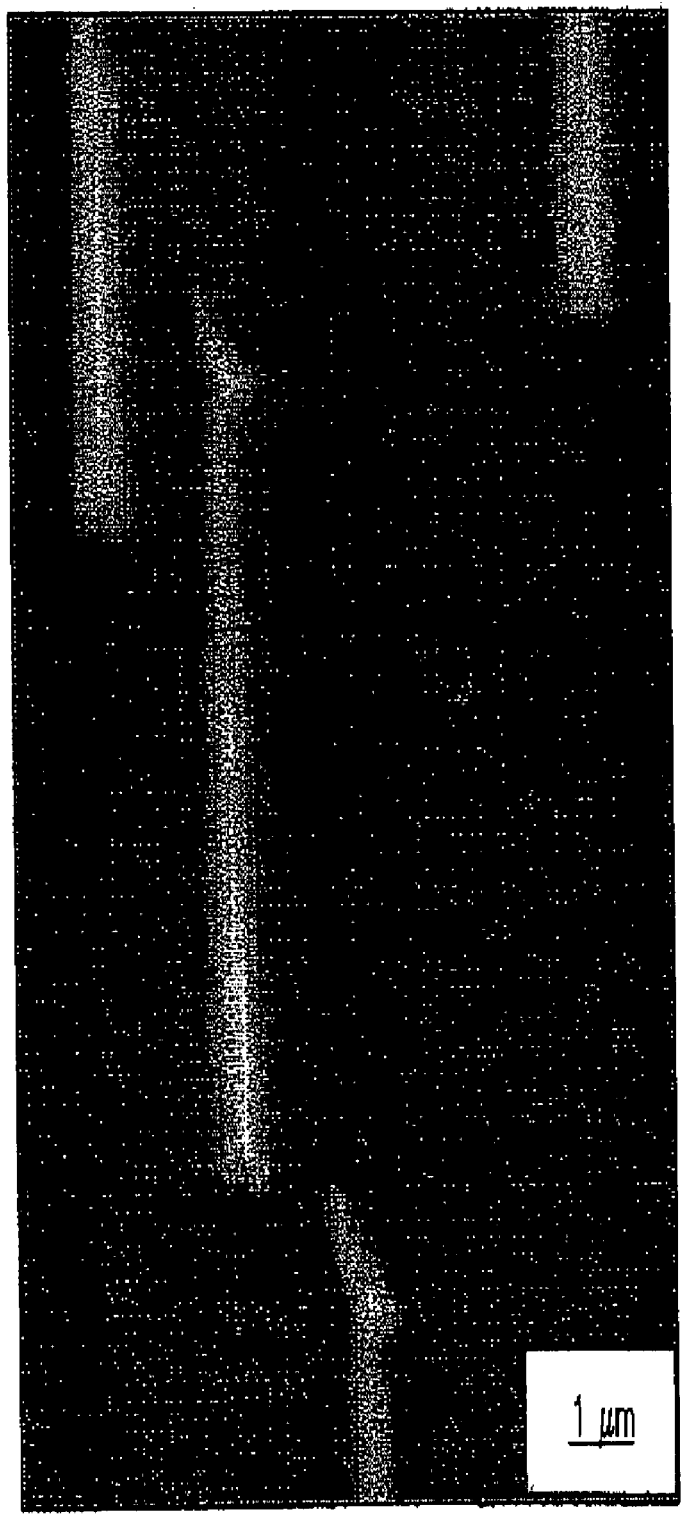
FIG. 15 shows an SEM micrograph of double-bent carbon nanotubes.

Shown in FIG. 15 is an SEM microscope image of double-bent carbon nanotubes produced by electric field guided CVD growth of carbon nanotubes as described earlier. Such double bent CNTs are useful for sidewall tracing in a variety of configurations. However, for sidewall tracing CD (critical dimension) probes for smaller dimensions, such as needed for inspection of 45 nm node or 32 nm node semiconductor devices, the extent of bent CNT growth has to be limited to avoid the overall sideways dimension of the probes becoming too thick or too wide.

Figure 16:
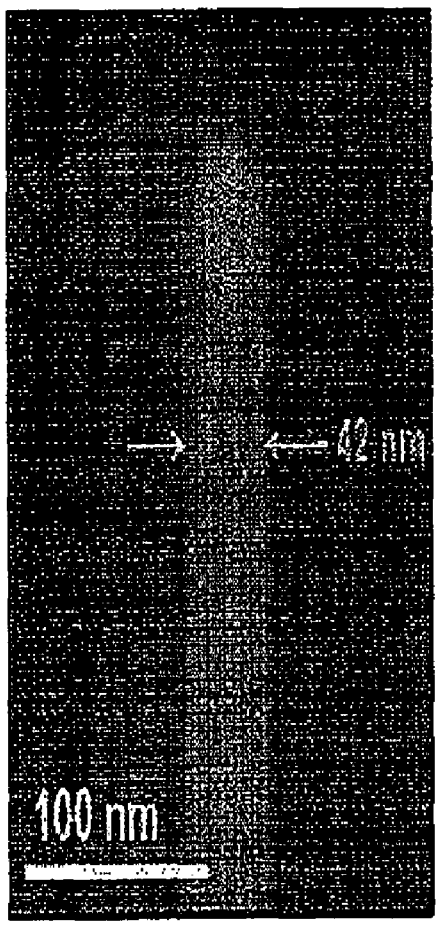
FIG. 16. Shows comparative SEM images of CNT probes grown on the top surface of a protruding AFM pedestal (a) straight CNT probe by 2-step growth, (b) with an additional CVD bent growth; and, FIG. 17. Shows SEM images of CNT probes grown on a protruding AFM pedestal (a) low magnification SEM image, (b) higher magnification of FIG. 17(a), (c) with an additional very short bent CNT growth.
Figure 16:
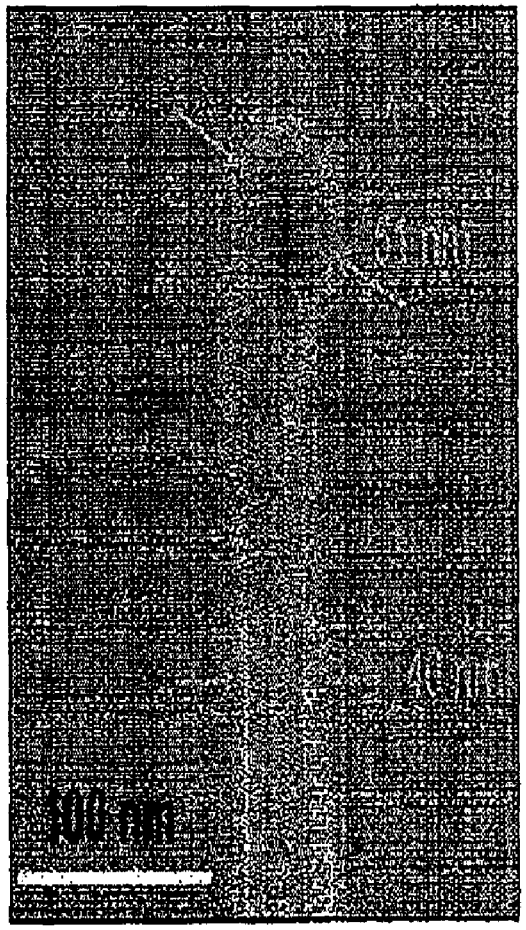

In this invention, it is demonstrated that a goof control of the bent CNT growth time leads to the control of the overall probe width. Shown in FIG. 16(a) and (b) are comparative SEM images of CNT probes grown on the top surface of a protruding AFM pedestal. FIG. 16(a) shows a straight CNT probe by a 2-step growth at 700° C. with a vertically applied electric field voltage of 600 V for 10 min followed by an additional CVD growth at 500 V for 3 min. The Ni catalyst island was patterned using a carbon mask island defined by EBID process (Electron Beam Induced Deposition). See an article by I-Chen Chen et al., "Extremely sharp carbon nanocone probes for atomic force microscopy imaging", *Appl. Phys. Lett.* 88, 153102 (2006).

FIG. 16(b) represents the CNT tip configuration after an additional CVD growth step for CNT bent-growth by applying a tilted electric field of 500 V for 15 sec while maintaining all other CVD growth processing parameters in the identical conditions. The sharp and abrupt bending of the CNT tip configuration useful for sidewall tracing is evident from FIG. 16(b).

Figure 17:
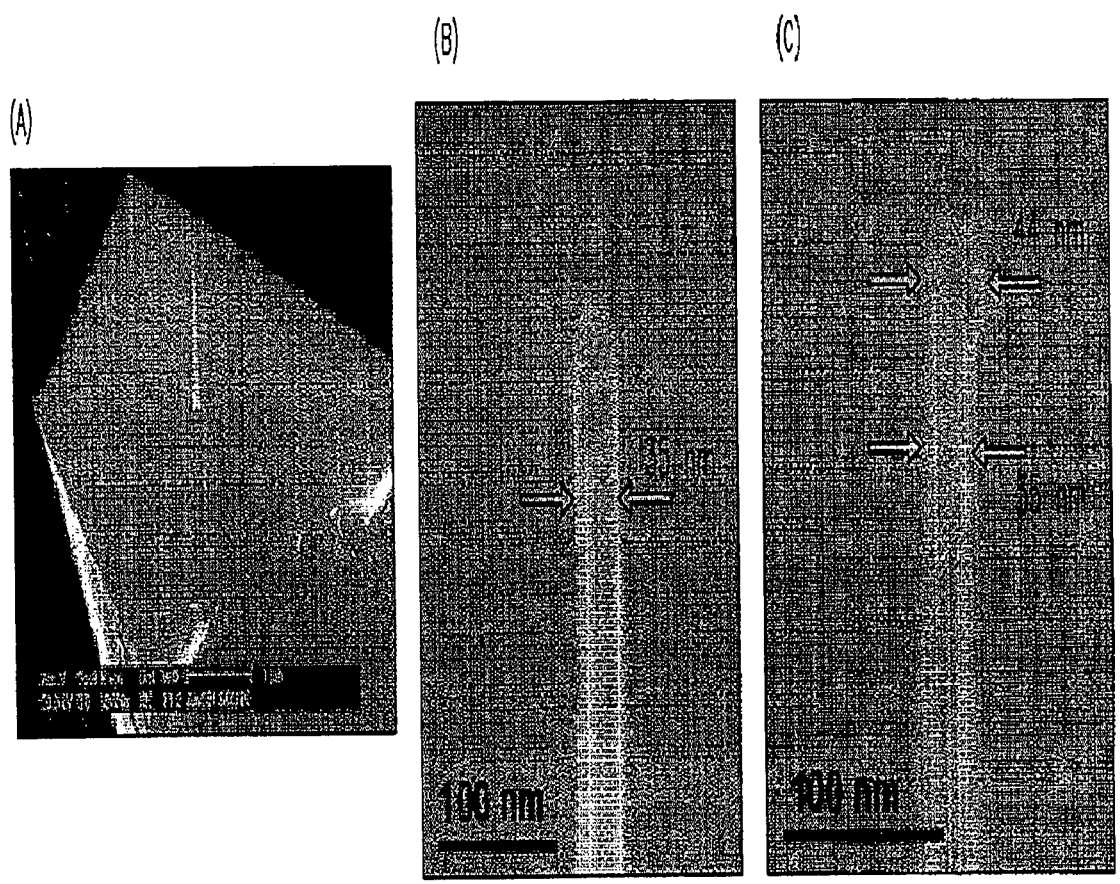

In order to demonstrate that the overall lateral dimension (the overall width of the probe) can be made smaller so that the sidewall tracing probe can be inserted into small trenches, an even shorter bent-CNT growth time was utilized as shown in FIG. 17. FIG. 17 represents SEM images of CNT probes grown on a protruding AFM pedestal. The pedestal is a protruding, height-raising structure added onto a flat Si cantilever, and is often made of Si or Si nitride. An example pedestal structure containing an electric field guided, vertically CVD grown is shown in FIG. 17(a). The low magnification SEM picture of FIG. 17(a) shows the pedestal shape and a CNT probe CVD grown on the pedestal top with a vertically applied voltage of 550 V for 15 min. In FIGS. 17(b) and (c), comparative higher magnification images are shown. FIG. 17(b) represents the as-vertically-grown CNT probe (a higher magnification of FIG. 17(a)), while FIG. 17(c) shows the CNT tip configuration after an additional, very short bent-CNT growth using a tilted electric field of 550 V for 7 sec. A metal block made of molybdenum was placed in the direction of desired CNT bending (the righthand side of the CNT in FIG. 17(c)) to induce a tilted electrical field. All other CVD growth parameters were kept the same. It is clearly seen from FIG. 17(c) that a well controlled sidewall protrusion was created after the tilted electric field CVD, with the tip diameter of ~44 nm as compared to the stem diameter of 35 nm.

This process of sideway bending using a tilted electric field can be repeated twice to make the other side (the leftside of the CNT tip in FIG. 17(c)) also protrude more. The desired degree of side protrusion of the probe tip in the invented sidewall probes is at least 10% larger diameter than the stem diameter to allow sidewall tracing, but is less than 30% larger diameter than the stem diameter, so as keep the probe tip compact for easy insertion into narrow trenches or small via holes.

It is understood that the above-described embodiments are illustrative of only a few of the many possible specific embodiments which can represent applications of the invention. Numerous and varied other arrangements can be made by those skilled in the art without departing from the spirit and scope of the invention.

Various inventions and embodiments disclosed in this patent application include the articles and devices comprising the sidewall tracing nanoprobe structures described in FIGS. 1-17, methods described for fabricating such nanoprobe structures and devices, and applications of such probes for semiconductor and other nanostructure inspection.

We claim:

1. A method of subtractively fabricating a sidewall tracing nanoprobe, comprising,
   i) fabricating a carbon nanotube or nanowire by chemical vapor deposition,
   ii) said carbon nanotube or nanowire having a probe structure comprising an elongated stem portion having a probe tip and a metallic catalyst particle located at the probe tip,
   iii) modifying said metallic catalyst to make it more wear-resistant by one of: use of a pre-alloyed metallic catalyst for nanotube CVD growth; modifying the metallic catalyst by deposition of a metal onto the metallic catalyst and applying an annealing heat treatment to form a mechanically stronger alloy or intermetallic compound; or coating the metallic catalyst with a layer of wear-resistant material, and
   iv) removing a portion of the material from side walls of the carbon nanotube stem so that the metallic probe tip protrudes sideways in at least two directions or all the way around the circular periphery of the probe tip.

2. The method of fabricating a sidewall tracing carbon nanoprobe of claim 1 comprising removing a portion of the material from side walls of the nanotube stem so that the probe tip protrudes sideway by at least 10% larger diameter than the stem diameter to allow sidewall tracing, but less than 30% larger diameter than the stem diameter so as to keep the probe tip compact for easy insertion into narrow trenches or small via holes.

3. The method of fabricating a sidewall tracing carbon nanoprobe of claim 1 wherein the elongated nanoprobe stem is fabricated from carbon nanotube, or carbon nanocone.

4. The method of fabricating a sidewall tracing carbon nanoprobe of claim 1 in which the method for removing a portion of the material from the side walls of the nanotube stem is by plasma etching, chemical etching, or electrochemical etching.

5. The method of fabricating a sidewall tracing carbon nanoprobe of claim 1 in which the nanoprobe tip is made of a metallic alloy or intermetallic compound selected from the group consisting of nickel alloy, cobalt alloy, iron alloy, gold alloy, or palladium alloy.

6. An additive method of fabricating a sidewall tracing carbon nanoprobe comprising,
   i) fabricating a carbon nanotube or nanowire by chemical vapor deposition,
   ii) said carbon nanotube or nanowire having a probe structure comprising an elongated stem portion and a metallic catalyst particle located at the probe tip, and
   iii) depositing another material by vertical deposition onto the catalyst particle to increase the diameter, to make it larger than the stem diameter, all the way around the circular periphery of the probe tip, so that the protruding regions of the enlarged catalyst particle serve to perform sidewall tracing operations, in which the deposited material is selected from the group consisting of a metal alloy, intermetallic compound or mechanically hard carbide, nitride, oxide, fluoride or boride.

7. The method of fabricating a sidewall tracing carbon nanoprobe of claim 6 wherein the elongated nanoprobe stem is selected from carbon nanotube or carbon nanocone.

8. The method of fabricating a sidewall tracing carbon nanoprobe of claim 6 in which the nanoprobe tip is made of a metallic alloy or intermetallic compound selected from the group consisting of nickel alloy, cobalt alloy, iron alloy, gold alloy, or palladium alloy.

9. The method of fabricating a sidewall tracing carbon nanoprobe of claim 6 wherein the stem diameter is also reduced by plasma etching, chemical etching, or electrochemical etching.

10. The sidewall tracing carbon nanoprobes of claim 6 in which the metallic catalyst particle located at the probe tip is made more wear-resistant by one of: the use of a pre-alloyed metal, by surface metal coating followed by diffusional annealing, or by coating the catalyst particle surface with a layer of wear-resistant material.

11. A method of fabricating a sidewall tracing carbon nanoprobe comprising,
   i) fabricating a carbon nanotube or nanowire by chemical vapor deposition,
   ii) said carbon nanotube or nanowire having a straight probe structure comprising an elongated stem portion and a metallic catalyst particle located at the probe tip,
   iii) modifying said metallic catalyst to make it more wear-resistant by one of: use of a pre-alloyed metallic catalyst for nanotube CVD growth; modifying the metallic catalyst by deposition of a metal onto the metallic catalyst and applying an annealing heat treatment to form a mechanically stronger alloy or intermetallic compound; or coating the metallic catalyst with a layer of wear-resistant material, and
   iv) bending the tip of the straight stem by chemical vapor deposition using tilted electric field guided re-orientation of the probe tip, with the bent tip enabling sidewall tracing operations.

12. The method of fabricating a sidewall tracing carbon nanoprobe of claim 11 wherein the tip bending process is repeated at least twice for each nanoprobe in different directions, so that the bending and resultant side protrusion occurs in at least two directions off the side of the probe tip.

13. The method of fabricating a sidewall tracing carbon nanoprobe of claim 11 wherein the probe tip protrudes sideway by at least 10% larger diameter than the stem diameter to allow sidewall tracing, but less than 30% larger diameter than the stem diameter, so as to keep the probe tip compact for easy insertion into narrow trenches or small via holes.

14. The sidewall tracing carbon nanoprobe of claim 11 wherein the elongated nanoprobe stem is fabricated from carbon nanotube or carbon nanocone.

15. The method of fabricating a sidewall tracing carbon nanoprobe of claim 11 in which the nanoprobe tip is made of a metallic alloy or intermetallic compound selected from the group consisting of nickel, nickel alloy, cobalt, cobalt alloy, iron, iron alloy, gold, gold alloy, palladium, or palladium alloy.

16. A method of fabricating a sidewall tracing carbon nanoprobe of claim 1, 6, or 11 wherein a hard coating selected from the group consisting of carbide, nitride, oxides, fluorides, boride or intermetallic compound is added to the top surface of the exposed catalyst particles to form a wear resistant probe tip.

17. A method of fabricating a sidewall tracing carbon nanoprobe of claim 1, 6, or 11 further comprising depositing a hard coating on the surface of the catalyst particle by depositing a layer of diffusible metal or alloy and using an annealing heat treatment, by heating the catalyst particle at 300 to 1000° C. for 1 to 1000 minutes in an inert or reducing atmosphere, to modify the composition of the tip catalyst particle to form a mechanically hard, wear resistant, alloy or intermetallic compound at the surface of the probe tip.

18. The method of fabricating a sidewall tracing carbon nanoprobe of claim 1, 6, or 11 wherein the carbon nanoprobe is grown on top of a height-raising pedestal added onto a flat silicon cantilever.

19. The method of fabricating a sidewall tracing carbon nanoprobe of claim 1, 6, or 11 wherein an in-situ-made, carbon nanocone pedestal is added as a support for the elongated stem probe, by gradual sputtering away of some of the catalyst particle in the presence of an electric field of from 550 to 600 volts during chemical vapor deposition of a carbon nanotube or nanowire, reducing the diameter of the carbon nanotube or nanowire as it grows, reducing the electric field to from 450 to 500 volts to continue the growth of the carbon nanotube or nanowire in a straight, equi-diameter manner, followed by removing a portion of the material from the side walls of the nanotube stem by plasma etching, chemical etching or electrochemical etching to form a side protruding probe tip structure protruding sideways in at least two directions or all the way around the circular periphery of the probe tip.

20. The method of fabricating a sidewall tracing carbon nanoprobe of claim 1, 6, or 11 wherein the sidewall tracing tip configuration is improved by removing the top portion of the material near the exposed region of the metallic catalyst nanoparticle by at least 25% of the particle height, to flatten the particle shape, so as to make the edge of protruding tip particle protrude sideway with a sharper edge.

21. The method of fabricating a sidewall tracing carbon nanoprobe of claim 20 wherein the flattening of the metallic catalyst particle at the tip is carried out by chemical etch, electrochemical etch, directional ion etch, or a metal selective ion etch.

22. The sidewall tracing carbon nanoprobes of claim 1, 6, or 11 used for the inspection of semiconductor devices for evaluation of defects on the side wall of trenches or via holes.

* * * * *